(12) United States Patent
Vitta et al.

(10) Patent No.: US 10,070,098 B2
(45) Date of Patent: Sep. 4, 2018

(54) METHOD AND SYSTEM OF ADJUSTING VIDEO QUALITY BASED ON VIEWER DISTANCE TO A DISPLAY

(71) Applicant: INTEL CORPORATION, Santa Clara, CA (US)

(72) Inventors: Hari B. Vitta, Bangalore (IN); Sean J. Lawrence, Bangalore (IN); Raghavendra Angadimani, Bangalore (IN); Deepakumar Kv, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/286,894

(22) Filed: Oct. 6, 2016

(65) Prior Publication Data

US 2018/0103230 A1    Apr. 12, 2018

(51) Int. Cl.
| | |
|---|---|
| *H04N 7/01* | (2006.01) |
| *H04N 19/182* | (2014.01) |
| *H04N 19/186* | (2014.01) |
| *H04W 4/00* | (2018.01) |
| *H04W 4/80* | (2018.01) |

(52) U.S. Cl.
CPC ......... *H04N 7/0125* (2013.01); *H04N 7/0117* (2013.01); *H04N 7/0147* (2013.01); *H04N 19/182* (2014.11); *H04N 19/186* (2014.11); *H04W 4/008* (2013.01); *H04W 4/80* (2018.02)

(58) Field of Classification Search
CPC ... H04N 7/0125; H04N 19/182; H04N 19/186
See application file for complete search history.

(56) References Cited

U.S. PATENT DOCUMENTS

| | | | |
|---|---|---|---|
| 6,441,857 B1* | 8/2002 | Wicker | H04N 7/01 345/603 |
| 9,781,487 B2* | 10/2017 | Lin | H04N 21/6405 |
| 2010/0169935 A1* | 7/2010 | Abbruzzese | G11B 5/584 725/62 |
| 2011/0243246 A1* | 10/2011 | Pettersson | H04N 19/176 375/240.24 |
| 2012/0002082 A1* | 1/2012 | Johnson | G06T 5/50 348/234 |
| 2015/0179150 A1* | 6/2015 | Andrysco | G09G 5/391 345/156 |
| 2015/0264299 A1* | 9/2015 | Leech | H04N 21/44218 348/78 |

OTHER PUBLICATIONS

Bale, "1080p Does Matter—Here's When (Screen Size vs. Viewing Distance vs. Resolution)", http://carltonbale.com/1080p-does-matter/, 3 pages; 2012.

* cited by examiner

*Primary Examiner* — Sumaiya A Chowdhury
(74) *Attorney, Agent, or Firm* — Green, Howard & Mughal LLP

(57) ABSTRACT

A system, article, and method are provided for adjusting video quality based on viewer distance to a display.

25 Claims, 12 Drawing Sheets

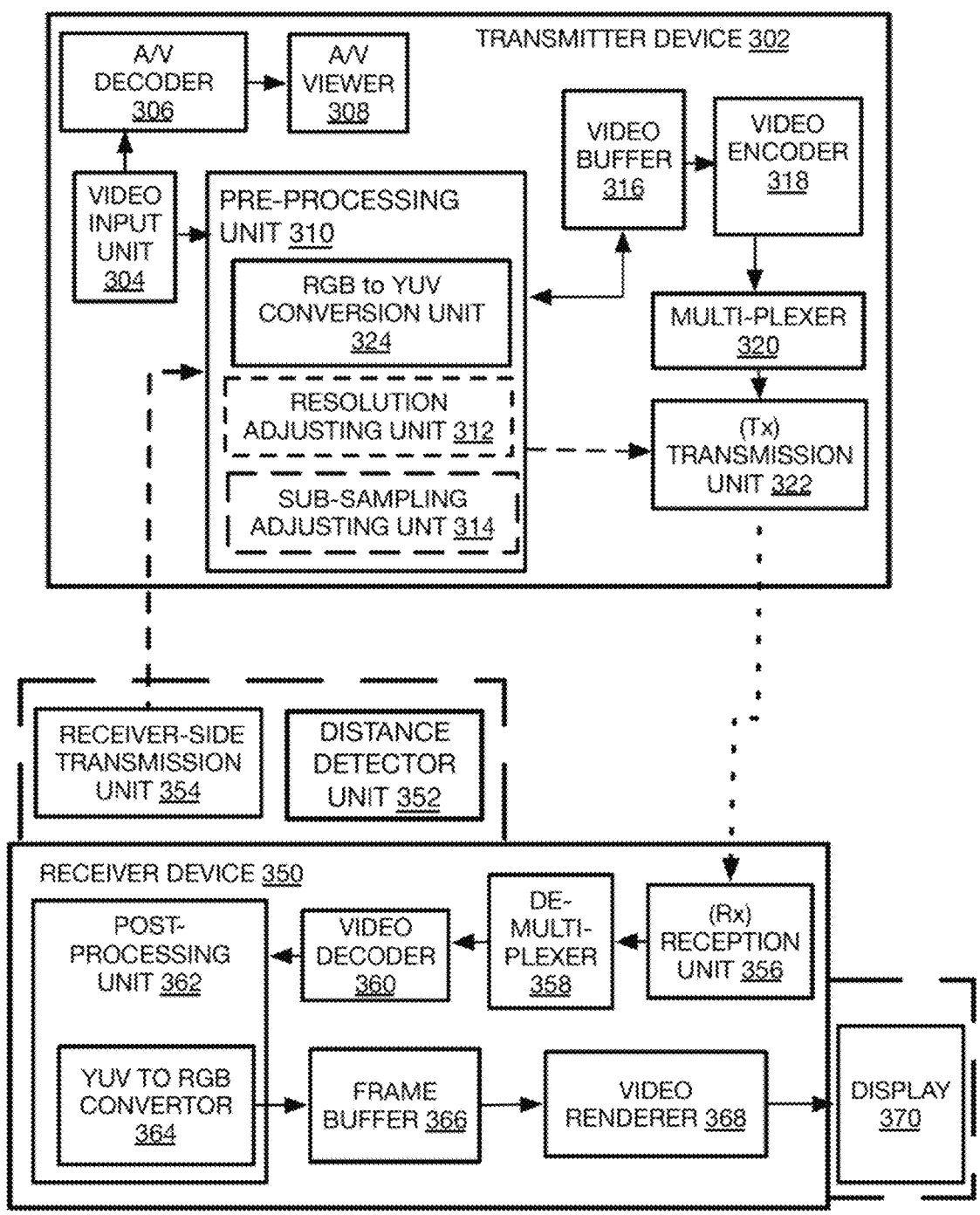

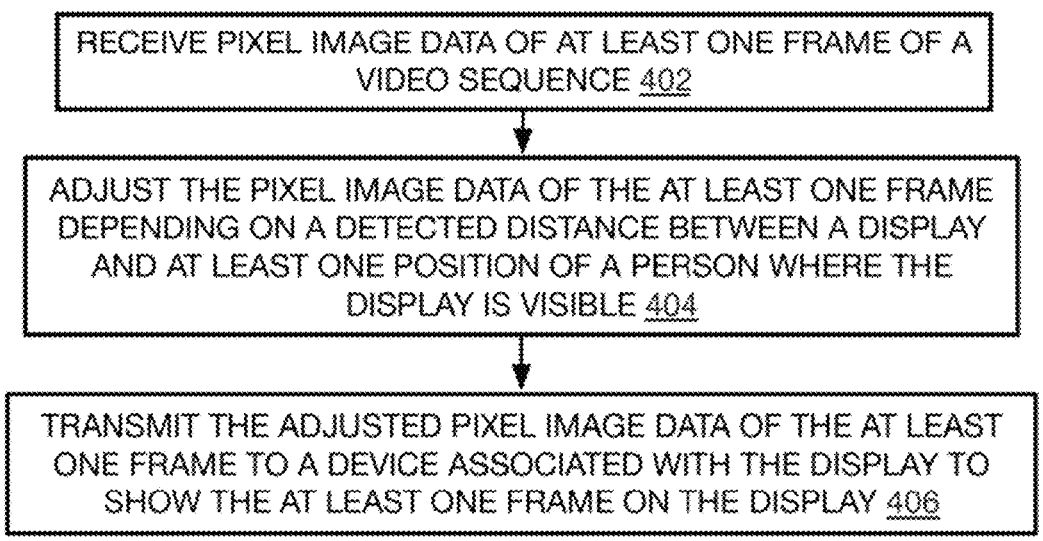
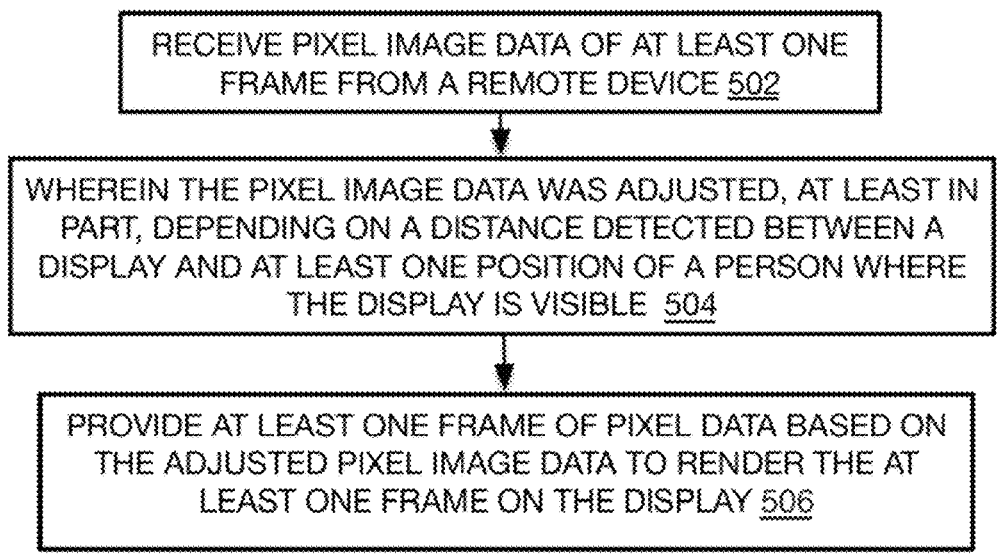

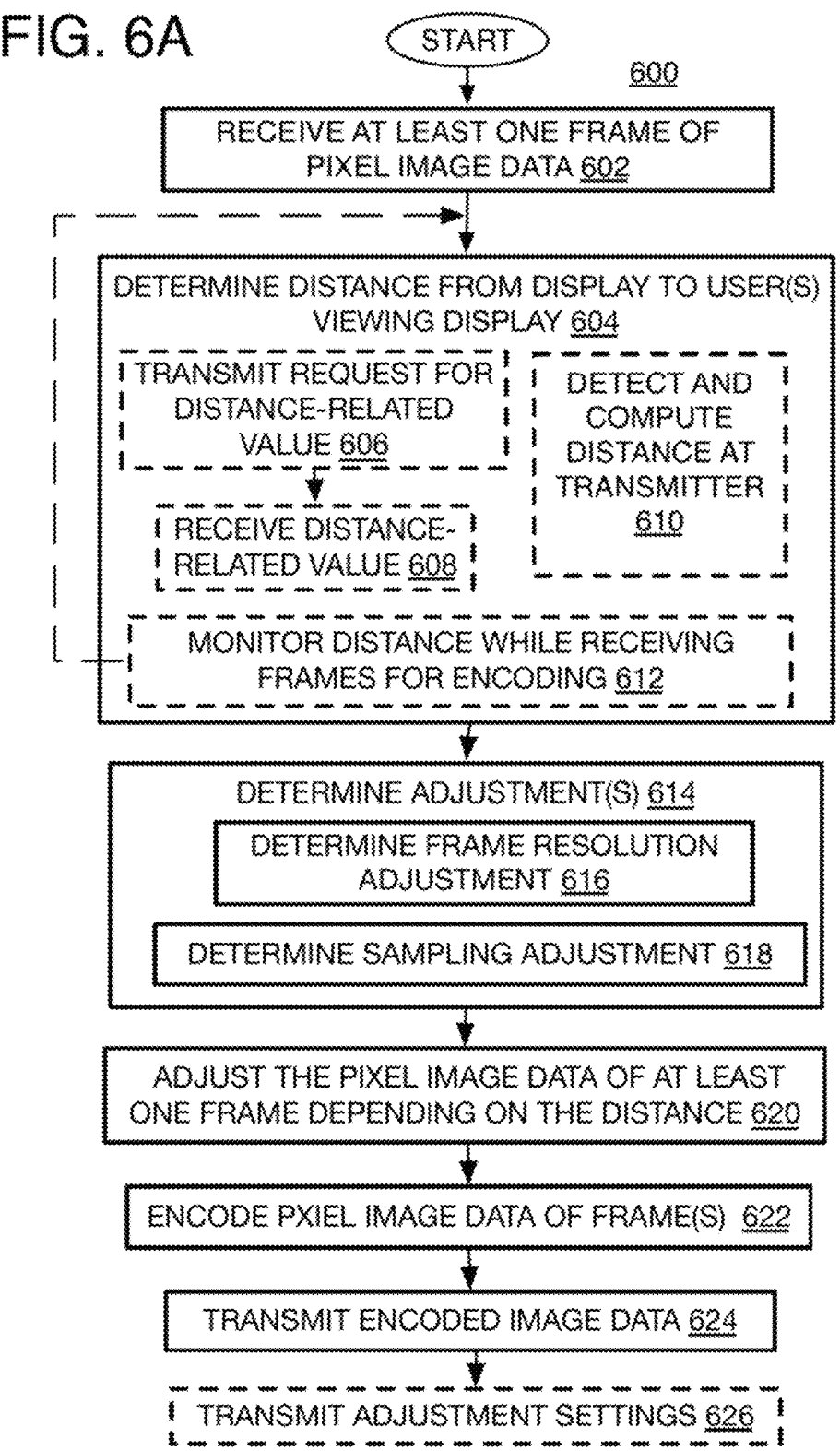

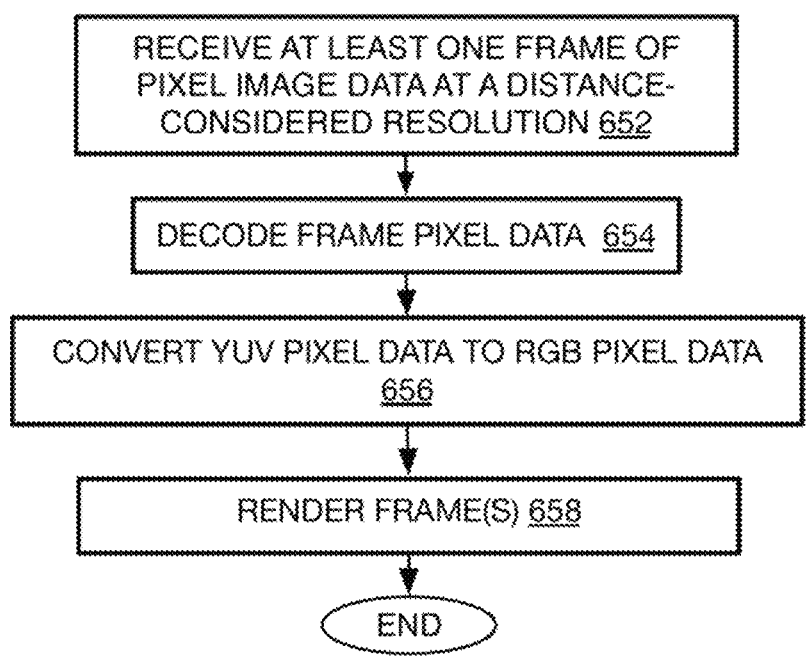

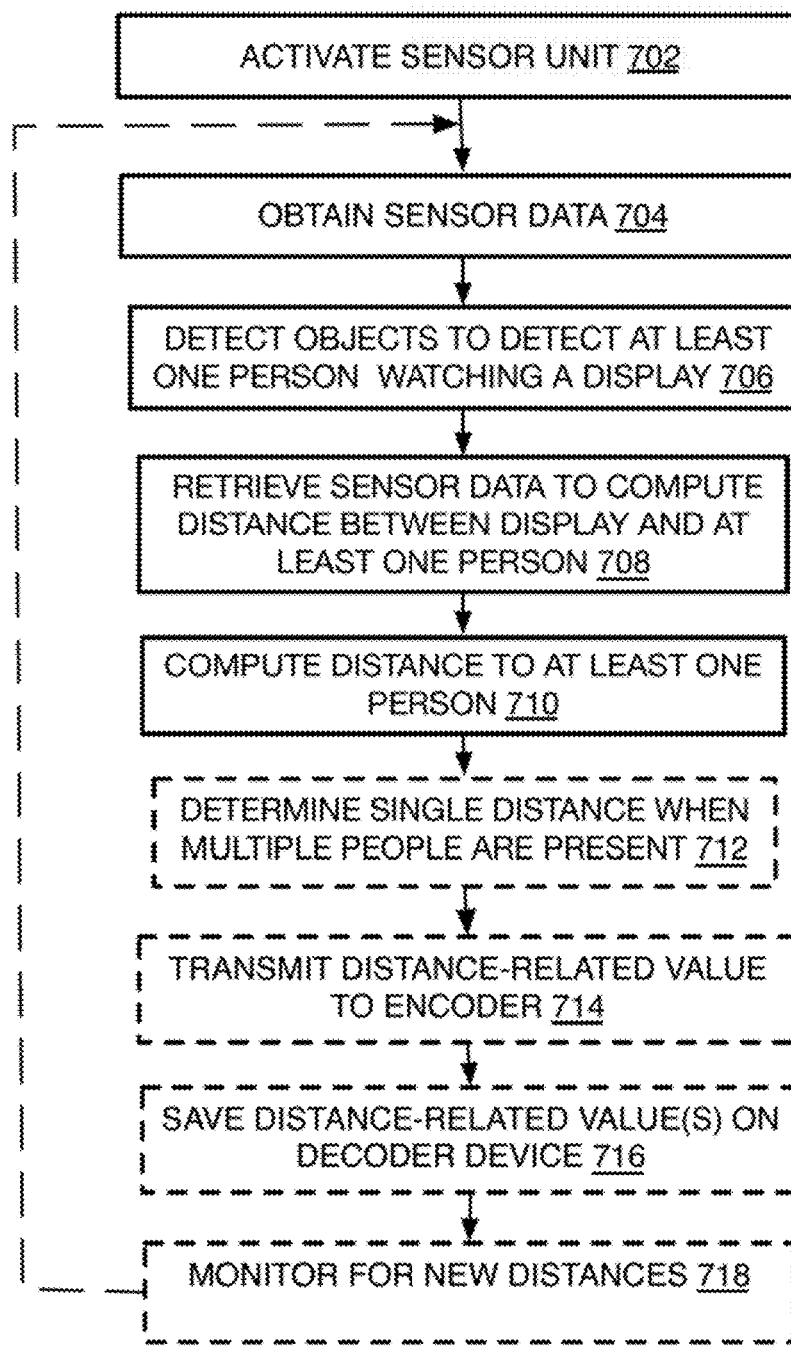

Viewing Distance vs. Screen Size for Chroma Sampling Benefit for a given Resolution

METHOD AND SYSTEM OF ADJUSTING VIDEO QUALITY BASED ON VIEWER DISTANCE TO A DISPLAY

BACKGROUND

The demand for high quality display of video is increasing from television resolutions of 720p, 1080p, 1600p, up to 4K and 8K and so on, with ever increasing numbers of pixels. A parallel demand occurs with chroma sampling where YUV 4:4:4 sampling (without sub-sampling the chroma pixels) is desirable for encoding to obtain higher quality images versus the typical YUV 4:2:2 or 4:2:0 sub-sampling schemes with decreased chroma sampling. These increases result in a corresponding increase in bandwidth and power consumption for wireless display transmitters. Specifically, some video coding systems compress image data on one device for transmission to another device. This may include videos downloaded over wired or wireless networks such as cable television, satellite, high definition multimedia interface (HDMI), and WiFi to name a few examples. Other such video coding systems are short-range or personal area network (PAN) mirroring systems such as Miracast™ and wireless docks that transmit video and/or audio files, or otherwise what is viewed on the screen and audible on a transmitting device, and typically to a remote receiving device that is more convenient or provides a better experience for viewing or listening to the video and/or audio. For example, a movie may be played or processed on a smartphone while viewing the video of the movie and listening to the audio on a large television. In other examples, the screen shots from a laptop may be transmitted to a conference room projector, or a cable box may transmit a show to a smaller device such as a tablet in addition to, or instead of, the television. In these cases, the system must format the video at the source side transmitting the compressed video to the destination device with the display in order to provide the display with the higher quality video due to the increased resolution and sampling.

While much priority has been placed on increasing the quality of the images on the display, it has been determined that perceived increase in quality and impact of a given resolution and/or sampling is dependent on the screen size and the distance a user is from the screen. When a user is sitting too far from the screen, increased resolution or sampling cannot be perceived. Thus, streaming video in higher resolutions and/or greater sampling is a waste of bandwidth and power consumption when it cannot be perceived by the user. As of yet, no system exists that adjusts the display quality based on the distance a user is positioned from the display.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 3 is a schematic diagram of an example video processing system used to perform the methods of adjusting video quality based on viewer distance to a display in accordance with the implementations herein;

FIG. 4 is a flow chart of a method of adjusting video quality based on viewer distance to a display in accordance with the implementations herein;

FIG. 5 is a flow chart of another method of adjusting video quality based on viewer distance to a display in accordance with the implementations herein;

FIG. 6A is an example computer-implemented process of adjusting video quality depending on a viewer distance to a display;

FIG. 6B is another example computer-implemented process of adjusting video quality depending on a viewer distance to a display;

FIG. 7 is a detailed flow chart of another method of adjusting video quality based on viewer distance to a display in accordance with the implementations herein;

DETAILED DESCRIPTION

Figure 1:
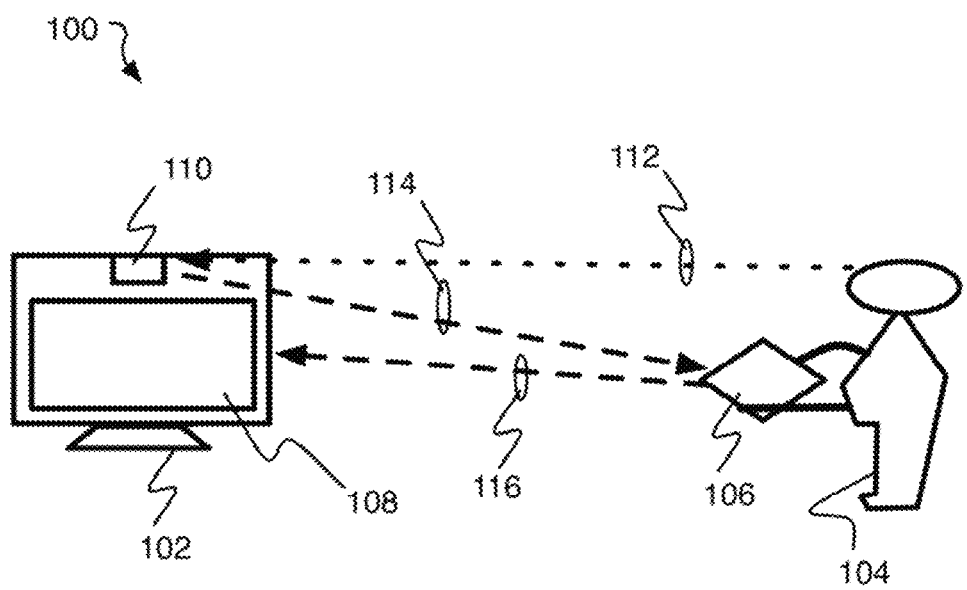
FIG. 1 is a schematic diagram of a network used in a system adjusting video quality based on viewer distance to a display in accordance with the implementations herein.

One or more implementations are now described with reference to the enclosed figures. While specific configurations and arrangements are discussed, it should be understood that this is performed for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as laptop or desktop computers, tablets, mobile devices such as smart phones and other wearable smart devices such as smartglasses, smart watches, exercise bands, or smart headphones, video game panels or consoles, high definition audio systems, surround sound or neural surround home theatres, televisions, television set top boxes, projectors, and so forth, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

The material disclosed herein also may be implemented as instructions stored on a machine-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods of adjusting video quality based on viewer distance to a display.

As mentioned, user demands for display quality are increasing, from TV resolutions (also referred to herein as screen size or picture size) of 720p, 1080p, 1600p, to 4 k and 8 k and so on to name a few examples. A display device with a screen such as a television or computer monitor will have a maximum or native high resolution that fits the screen where all pixels are being used. To render an image with a reduced resolution on a television or a computer monitor or other computing device such as a smartphone, by one conventional form, the image of the size at the native resolution of the screen is overlaid on the desired resolution, and that area of the image that fills the pixel size of the desired resolution is then expanded using interpolation for example to fill the entire screen of the display device. By other options, the pixel size of a smaller resolution is maintained, and a black border is placed around the smaller image to fill the screen. Some display devices will also accept a larger resolution and eliminate the data of pixels at intervals throughout the larger resolution to fit the full screen.

Also as mentioned, the use of the higher resolutions results in corresponding increases in bandwidth and power consumption for wireless display solution transmitters that establish personal area networks (PANs) such as WiDi/Miracast™ and wireless docks. As explained above, these types of networks typically have a source or transmitter device, such as a smartphone or tablet, that encodes and transmits data to be decoded and displayed at a remote destination display device such as a large television or computer monitor, although many other configurations are possible as well.

In addition, increased chroma sampling such as 4:4:4 has become more desirable as well versus chroma information sub-sampling for encoder solutions such as YUV 4:2:0 and 4:2:2 used for many different video coding systems. Specifically, images are typically captured or otherwise obtained in the RGB color space by using a Bayer filter to establish RGB pixel data, for example, and are then converted to YUV color space for encoding and other tasks. Generally, in YUV sampling notation a 4×2 block of pixels is used, and 'Y' refers to a number of luminance samples in a single row, 'U' the number of chroma samples in the first or upper row, and 'V' the number of chroma samples in the next or second row thereby forming a Y:U:V sampling scheme. Thus, for example, for 4:2:0 forming a 4×2 sampling area, for a first row of 4 luminance values sampled, there are only two chroma values sampled in the first row and none in the second row. For 4:2:2 then, there is two chroma sampling in both the first and second rows. Relevant here, these sub-sampling schemes leave some non-sampled pixels without a chroma value. The color at these non-sampled pixels are typically formed by interpolation when not already formed by intra-prediction by using the color of neighbor pixels on the same frame to form the color for a pixel missing a chroma sample, or inter-prediction which is using data from multiple frames during the transcoding process. This saves a tremendous amount of computational load and power consumption but reduces the quality of the images.

One attempt to resolve this issue was to use greater chroma sampling schemes such as YUV 4:4:4 so that the chroma sampling takes place on every pixel. This arrangement, however, becomes bit expensive by increasing the number of bits processed and compressed, transmitted in a bitstream, and decompressed, which in turn increases the power consumption as well as the bandwidth requirements for video transmission applications on video transmission devices such as WiDi/Miracast™, wireless docking, and other wireless systems to name a few examples either causing a slowing of the system or requiring physical upgrades to transmission equipment that provide a greater bandwidth but that becomes too financially expensive for the user desiring small inexpensive devices. It should be noted that herein YUV is used generally to refer to any luminance or luma Y value (including Y') and color U and V values that can be used with the methods herein, and including YCbCr and whether or not gamma based for example.

To resolve these issues, it has been determined that the perceived quality and impact of a given resolution is dependent on the screen size and the distance the user is from the screen. For example, for a screen size of 50 inches with the user eight feet away, the benefit of 4 k resolutions over 1080p will not be perceivable. Under this scenario, streaming 4 k resolutions would be a waste of bandwidth and power. To take advantage of this, a sensor or camera may be used to detect the distance from the display to a user viewing the display. This distance, or a value associated with the distance, then may be transmitted to the transmitting and encoding device to set the resolution and/or chroma subsampling that should be used to encode image data of a frame or video sequence to be sent to a destination decoder device to display the video sequence at a resolution and sampling that has quality that can be perceived by a viewer at the detected distance but at a resolution and/or sampling that does not waste bandwidth and power. The network bandwidth and power savings would be proportional to the reduction in resolution resulting in significant gain when for the same perceived quality, a lower resolution is transmitted. The details are provided below.

Referring to FIG. 1, an image processing network 100 is shown and that can be used with at least some of the implementations herein to adjust video quality based on viewer 104 distance to a display device 102. The display device 102 may be any television, computer monitor, or other display device with a screen 108 for viewing decoded videos in the form of frame sequences having pixel image data. The display 102 may be a computing device such as a lap top computer with an internal screen, desk top computer with a separate monitor, television with decoding capability, smartphone, tablet, and so forth. It will be understood that while the display and decoder may be in a single integrated device, the decoder may be, or may be in, a separate device that is wired or wirelessly connected to the display.

The user or viewer 104 is shown holding or otherwise having a remote source or transmitter device 106 which may be a handheld device such as a smartphone or tablet, but also could be any other device that has the ability to receive data, encode video or frame sequences, and transmit the compressed image data to a destination, receiver, or decoder device 102. While one viewer is shown, more than one person may be present, and the distance 112 used as explained below may be from the display 102 to a group of people where the distance to the closest person in the group or other combination of the distances to each person may be used as explained below.

Whether on the display, integral with the display (as shown), or separate from the display, at least one distance detection unit 110 may be provided in the form of an RGB-D camera or an IR sensor to name a few examples, in order to measure the distance between the display and at least one viewer 104 watching the display. The distance detection unit 110 may actually include more than one sensor, such as three, when 3D capture is determined by triangulation for example, and such distance detection unit also may include, or may provide data for, object detection capability to differentiate people from other objects. It will be understood that the distance detection unit 110 need not be integrated with the display 102 as long as the distance detection unit is calibrated to include the distance between the distance detection unit 110 and the screen 108 of the display 102, or the distance between the distance detection unit 110 and the screen 108 can be computed when the distance detection unit 110 only determines the distance from the distance detection unit 110 to the viewer 104.

This arrangement is mainly used to explain the resolution tuning but could also be used to modify the sampling as discussed below. In operation of the arrangement shown, the remote device (or source) 106, or another separate device, may activate the distance detection device 110 to at least measure the distance to the viewer 104 (as shown by dotted line 112). A value related to the distance is then transmitted back to the source 106 (dashed arrow 114), and by one example, on a user input internet protocol back channel such as a WiFi user interface back channel (UIBC) or universal serial bus (USB) over internet protocol (UOIP) channel of a PAN, mirroring, or wireless network, such as WiDi/Miracast™ type of network. This also could be any type of video on demand system that remotely controls the video playing separate from the device that actually streams the video. It will be understood that the distance-related value transmitted may be the distance itself, a computed perceptible resolution (or sampling as explained below) value(s), or an index value or indicator such as for a look-up table or other table or listing, that indicates which resolution or sampling is computed or selected. The source then uses the transmitted and received resolution setting (and/or sampling setting if present) in order to efficiently encode a video sequence without wasted increases in video quality, which is then transmitted to the decoder of the display 102. It is assumed that the display 102 has the capability to display a video sequence at the resolution set at the source, and a decoder typically has a post-processing YUV to RGB convertor that can handle the sampling schemes used by the transcode (the encoder and decoder).

Figure 2:
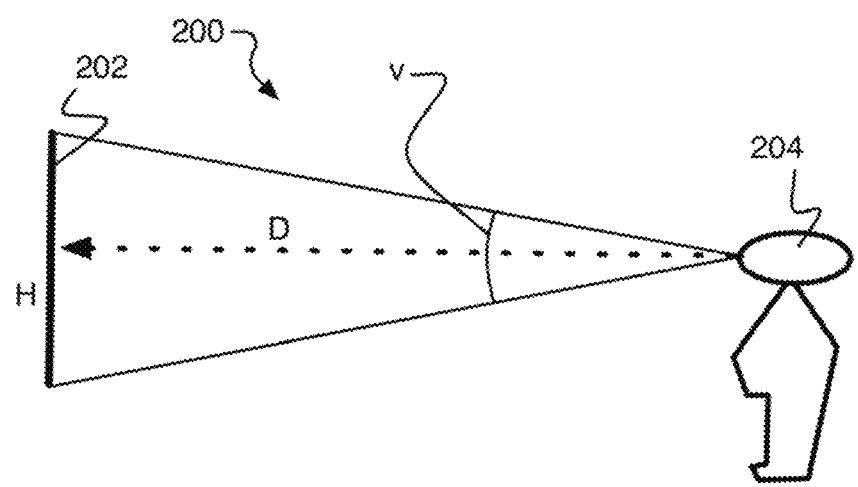
FIG. 2 is a schematic diagram to explain the distance from a display to a person watching the display.

Referring to FIG. 2, the dimensions involved for the computations to determine whether a viewer can perceive an increase in video quality either by a change in resolution or a change in sampling scheme are demonstrated for consistency herein. Thus, the detected distance D used herein is considered to be the distance to the screen of a display 202 to the viewer 204, and any additional distance between the distance detection unit and the display is either already compensated for or is negligible. The distance D is used for both resolution tuning and sampling adjustment. The height H of the display 202 as well as the included viewing angle v of the viewer 204 relative to the height H of the display are additionally used for sampling modification. Both are described in detail below.

It also will be understood that the methods herein primarily apply to systems with encoders that compress frames at a single resolution among a number of resolutions that are available for encoding, rather than scaled video coding (SVC) H.264 extension, for example, that is capable of transmitting multiple streams each at a different resolution so that the decoder can select a compatible or desired resolution. In this latter case, there would be no need to transmit the distance to the encoder, and therefore, no need for the present methods. Also, such multiple streams are typically too computationally heavy, power consuming, and bit consuming for many small PAN or mirroring networks. The desired resolution is simply indicated to the decoder, while the display sets the desired rendering settings.

Referring to FIG. 3, an image processing system (or video coding device) 300 is one example system that can perform the adjustment of video quality based on viewer distance to a display. By this example, system 300 may have a data pipeline of a short-range screen mirroring system or personal area network (PAN) system that transmits images (and can optionally transmit audio) from a transmitting device 302 to a remote receiving device 350 for viewing alone or viewing and listening. The transmitting device 302 may be processing or playing the video and/or audio during the transmission to the receiver. For example, a movie may be played on a smartphone while both viewing the video of the movie and listening to the audio on a large television. In other examples, the screen of a laptop may be transmitted to a conference room projector, or a cable box may transmit a show to a smaller device such as a tablet in addition to, or instead of, the television. Other examples include short range wireless displays with wireless docking. These systems are often described as wirelessly replacing the connection wire from the computer to the display and/or speaker. While the example of system 300 may be an audio-video (AV) processing system that performs both video and audio coding, it will be understood that the processes described herein may work equally well on systems that only perform video coding.

Particularly, the transmitter device (or just transmitter or source) 302 may be communicatively coupled or paired to the remote receiver device (or sink or simply receiver) 350 to transmit a bitstream with either a video data signal alone or an audio-video (AV) data signal to the receiver device 350. The methods herein are particularly suited for wireless transmission of the video bitstream but some implementations may be wired.

By one implementation, the transmitter 302 has a video input unit 304. Audio units are not shown or discussed since they are not particularly relevant here but may be present. The video for the video input unit 304 may be obtained from a wide variety of upstream sources. This includes from volatile or non-volatile memory on the transmitter or accessible by the transmitter, video streamed to the transmitter over wide area networks (WANs) such as the internet and/or other telecommunications networks, or provided over local area networks (LANs) such as that within an office, residence, or other facility. The transmitter and receiver also may be, may be part of, or may have one or more cameras (such as that described below) and audio capture devices such as one or more microphones. Many arrangements are possible including the receipt of video without audio.

When the transmitter 302 optionally has the capability to display video input such as with a smartphone or tablet, the transmitter 302 may have its own video or AV decoder 306 that provides decoded video and audio data to an AV viewer 308. Thus, in some cases it may be possible to view the video on the transmitter while also viewing the video on the receiver. In some cases, the viewer 308 may be turned off while paired to the receiver. The AV decoder 306 may implement a codec compatible with that implemented by an AV source upstream of the transmitter when so provided and to generate audio and video data.

Once obtained from the video input unit 304, the raw video data stream may be provided to a pre-processing unit 310 that applies pre-processing to the image data in the RGB color space such as demosaicing, if not already applied, to obtain RGB values for each or individual pixels, trimming, other color correction techniques, and/or de-noising. The RGB color space images are then stored in a video buffer 316 that may be RAM, such as DRAM, cache, or other memory, and that may store the video frames in various states and versions, including during encoding. The image data then may be obtained for conversion from RGB to YUV color space by a RGB to YUV conversion unit 324 before being provided to the video encoder 318. The resolution of the frames to be compressed also may be set by the pre-processing unit 310. These conversions may be based on the viewer distance-related value received from the distance detector unit 352 described in detail below. By one form the pre-processing unit 310 also has a resolution adjusting unit 312 and/or a sub-sampling adjusting unit 314 to make these adjustments. Either the resolution adjusting unit 312 and/or the sub-sampling adjusting unit 314 receives an actual distance value as the transmitted distance-related value or a value already converted into a resolution or sub-sampling value, or an index number to look up the value based on the transmitted distance-related value on a table or other listing. Such a table or listing may be stored on any memory accessible to the transmitter 302.

The resolution and sampling adjusting units 312 and 314 then apply the appropriate settings and convert the image data to the desired sampling scheme and/or resolution. The RGB values are converted to YUV by using the desired sampling. The resolution is then adjusted, if not already in the correct resolution, by upsampling or downsampling the initial YUV data (or it may be performed simultaneously). Thus, during downsampling for example, the pre-processing unit 310 may simply omit the computation of image data for pixels at certain uniform horizontal and vertical intervals that are not on a desired pixel location of a desired sampling scheme. Likewise, during upsampling, interpolated pixel image data may be added at uniform intervals and consistent with the desired sampling scheme. Upsampling also may involve requesting or accessing the source of the video content (network, or read from file on a disk for example) for higher resolution content.

It will be appreciated that other pre-processing operations such as additional de-noising and so forth may be applied to the YUV formatted image data at the desired resolution, and before the YUV frame data is provided to the encoder 318.

The encoder 318 may implement any codec known to perform one or more of transformation, quantization, motion compensated prediction, loop filtering, and so forth. In some implementations, video encoder 318 complies with one or more specifications maintained by the Motion Picture Experts Group (MPEG), such as, but not limited to, MPEG-1 (1993), MPEG-2 (1995), MPEG-4 (1998), and associated International Organization for Standardization/International Electrotechnical Commission (ISO/IEC) specifications. In some exemplary implementations, encoder 318 complies with one or more of H.264/MPEG-4 AVC standard, HEVC standard, VP8 standard, VP9 standard specifications, and so forth.

System 300 also may include a multiplexer 320 to multiplex the video and audio coded elementary streams into a higher-level packetized stream that further includes meta-data fields that transmit additional data. In some implementations, multiplexer 320 codes the packetized elementary streams (PESs) into an MPEG program stream (MPS), or more advantageously, into an MPEG or multiplexed transport stream (MTS). In further implementations, the MTS is encapsulated following one or more of Real-Time Protocol (RTP), user datagram Protocol (UDP) and Internet Protocol (IP) as implementations are not limited in this context. In some RTP implementations for example, a Network Abstraction Layer (NAL) encoder (not depicted) receives the MTS and generates Network Abstraction Layer Units (NAL units) that are suitable for wireless transmission. By one optional form, which sampling scheme and which resolution was used by the encoder on a video sequence may be placed in the metadata of the frames, such as an encoded stream sequence header, other profile location, or may otherwise accompany the compressed frame data of the video sequence.

The transmitter 322 also may include a (Tx) transmission unit (or transceiver) 322 that may form a WiFi or other network transmitter stack and may be a wireless transmission device that obtains the packeted and coded stream data from the multiplexer 320, and then outputs a wireless signal representative of the coded stream data to the receiver 350, and in one form, directly to the receiver 350. By one approach, the transmission unit 322 may utilize any band known to be suitable for the purpose of directly conveying (e.g., peer-to-peer) the stream data for real time presentation on a sink device in a PAN system. The transmission unit 322 may operate in the 2.4 GHz and/or 5 GHz band (e.g., Wi-Fi 802.11n), and in some forms in the 60 GHz band. The transmission unit 322 may further support and/or comply with one or more High Definition Media Interface (HDMI) protocols, such as Wireless Home Digital Interface (WHDI), Wireless Display (WiDi), Wi-Fi Direct, Miracast™, WiDock, WirelessHD, or Wireless Gigabit Alliance (WiGig) certification programs. By other approaches, the systems and methods herein, and in turn the transmission unit 322 is compatible with any wide area network (WAN) or local area network (LAN) used for such purposes.

The receiver 350 may have or may be communicatively connected to a distance detector unit 352 (also referred to herein as a viewer distance detector, or generally and simply referred to as camera or sensor depending on the context herein). The distance detector may be in the form of an RGB-D camera that forms a 3D space and that uses 3 sensors one depth sensor and two color sensors to triangulate 3D locations, or infra-red (IR) cameras that have a projector and at least one sensor to sense the distance to an object from a reflecting beam. Other types of cameras or sensors may be used as long as the distance to objects in a scene within the view of the distance detector unit 352 can be measured.

In any of these cases, the distance detector unit 352 may be an integral part of a display 370 or may be an integral part of the receiver device 350 or both. Thus, the distance detector unit 352 may be wired to the display and/or receiver unit 350 or communicating wirelessly therewith. The distance detector unit 352 may be within the case of the display, such as at the top of a laptop or television screen as shown in FIG. 1, or may be separately mounted thereon such as separate webcam for example. Many variations are possible as long as the distance detector unit 352 is able to determine the following. First, the distance from the sensor(s) at the distance detector unit to the viewer(s) must be measured. Second, the distance from the screen to the sensor is either known or is negligible (if not assumed to be zero). Third, the distance or other distance-related value can be determined as representing the distance from the display to the viewer and can be transmitted to the encoder when and if needed. Thus, a receiver-side transmission unit 354 that can be used by the distance detector unit 352 may be present at the receiver device 350 or otherwise with the distance detector unit 352. As mentioned, this may be a user input back channel communication back to the encoder such as with the UOIP or UIBC, or otherwise with a WiFi, WiDi, PAN, or other mirroring connection.

The receiver 350 may be any compatible device that at least processes images, whether from a video sequence or still photos, for display on a display device 370 or other integral or remote display device, and may process and emit audio as well. The receiver 350 may be communicatively coupled or paired to the transmitter 302 to receive a wireless transmission of at least video data. An indication of the resolution and sampling scheme used by the encoder may be transmitted with the compressed data in the encoded stream sequence header for example, or separately back to the receiver to ensure the receiver provides decompressed data at the selected resolution and/or sampling. By other options, the decoder may inherently reconstruct the compressed frames at whichever resolution and sampling is provided by the encoder due to the pixel locations of the reconstructed frames at the decoder.

To accomplish these features, the receiver 350 may have a Rx reception unit 356 that receives and forms a WiFi or other network receiver stack of frames of video (and optionally audio) from the transmitted bitstream as well as receiving the resolution and sampling indication when this data is provided in the same bitstream as the other compressed image data for example. The reception unit 356 may use any frequency band and wireless communication protocol compatible with that of the transmission unit 322. The output of the reception unit 356 is provided to a de-multiplexer (or demux) 358, which is to process the encapsulated packetized streams into separate audio and video compressed data inputs. Demux 358 includes logic then to unencapsulate and extract audio and video payloads from a packetized AV stream as well as the overhead and header data including any encoded sequence stream data that includes the resolution and/or sampling the decoder is to use. In one form, demux 358 includes logic to de-multiplex the packet payloads based, at least in part, on MTS fields.

Decoder 360 then may use any codec compatible with that of encoder 318 to generate decoded digital video data that represents the input data. Thus, the decoded data provided by the video decoder 360 represents the input video, and in turn the video signals transmitted in the bitstream to the receiver 350. The decoder 360 may include any necessary pre-processing of the extracted image data, and the reconstruction of the images such that each pixel has a color value. The video coding here may be performed in the YUV color space such that the decoder only reconstructs those pixel locations that are sampled within the YUV sampling used at the encoder. This may be inherent simply by determining which pixel locations have color values provided by the encoder, or by receiving the desired sampling (such as in the sequence header) or both.

After decoding, a post-processing unit 362 may be provided, and among other features may have a YUV to RGB convertor 364 to convert decompressed color data (and actually the luminance values as well) into RGB color space data. When the sampling was 4:4:4, all pixel locations already have color data and need only be converted to RGB by conversion algorithms. Otherwise, when the decoder provides sub-sampled schemes such as YUV 4:2:2 or 4:2:0 for example, the color data of the missing pixel location locations may be determined by interpolation, before applying the YUV to RGB conversion algorithms. The difference is perceived because 4:4:4 sampling scheme without chroma sub-sampling provides more of the original color data which is more accurate than the 4:2:2 or 4:2:0 sub-sampling schemes where interpolated color data must be used to provide color data for all pixel locations for RGB image data. Alternatively, the conversion could be omitted or a certain YUV sampling could be applied when a display only accepts frames with a certain YUV sampling scheme. By other alternatives where resolution is being changed without a change in sampling, it will be understood that the decompression can occur in the RGB color space, and the convertor is not used.

Once the RGB convertor 364 at the post-processing unit 362 provides RGB compatible images for rendering, the RGB images are then held in a decompressed memory or buffer 366 accessible to the rendering unit or video renderer 368. It will be understood that the buffer 366 may be provided on one memory or a number of different memories. It also will be understood that the buffer may actually form different portions of the same single buffer or memory shared with non-corrected images from the decoder and/or encoded extracted images, and so forth. Many variations are possible as long as images (or frames or packets of image data) can be moved in and out of each buffer.

The video renderer 368 determines or receives the render settings and adjusts the settings, and this may include settings related to viewer distance. The video renderer 368 may include any equipment that modifies or enhances the video data before the video is played. This may include 3D processing and scaling or resolution adjustment to apply or generate the desired resolution, and so forth. A transmitted resolution value indicating which resolution to scale the frames to if the frames are not already in the right resolution may be adjusted by this unit by one option. As mentioned, the display may or may not be considered a part of the receiver as discussed for any of the receiver side displays herein. The images can then be retrieved for render on display 370.

It will be understood that if the decoder does not inherently, or as instructed, provide the resolution set at the encoder, the image data may be upsampled or downsampled during post-processing either before or after the YUV to RGB conversion if performed, and in addition to any resolution scaling provided by the renderer 368.

Referring to FIG. 4, an example process 400 of adjusting video quality based on viewer distance to a display is provided, and process 400 relates to the operations on a transmitter side of a video coding system. In the illustrated implementation, process 400 may include one or more operations, functions or actions as illustrated by one or more of operations 402 to 406 numbered evenly. By way of non-limiting example, process 400 may be described herein with reference to example video coding systems or devices of any of FIGS. 1-3, 9, and 13, and where relevant.

Process 400 may include "receive pixel image data of at least one frame of a video sequence" 402, and by one example, received by an encoder or transmitter of a video coding device or system. The images may be received in the form of frames of a video sequence where each frame may be provided in an initial picture size (or resolution) whether as captured by a camera or otherwise as transmitted and saved on the transmitter device. Each frame or image (or picture) may have original RGB values and may be ready for conversion to YUV values and/or scaling to a desired resolution during pre-processing for encoding, by one example.

Process 400 may include "adjust the pixel image data of the at least one frame depending on a detected distance between a display and at least one position of a person where the display is visible" 404, and as described, the distance between a display to show the video sequence and at least one viewer of the video sequence is detected, by 3D camera or IR sensor for example, and this distance may be used to determine a level of video quality that is perceivable by a viewer watching the video sequence on the display and at the detected distance. Object detection could be used to detect people viewing the video sequence and even could include face detection to determine whether the person is watching the display. Also, finding a distance may include finding a distance to one person in a group of people, such as the closest person, when there is more than one person, or the distance may be some combination such as an average. Choosing the level of video quality may include setting the frames to a resolution that can be perceived by the viewer or a sampling scheme that can be perceived by the viewer at the detected distance, and based on distance to video quality relationships explained in detail below. The resolution and sampling scheme may be selected by using a formula, listing, stored look-up table, or other conversion mechanisms that take a distance value as an input, and outputs a desired or maximum perceivable resolution and/or sampling scheme.

The computation or conversion of distance to video quality level may be performed at the receiver side, distance detector if separate, and/or the transmitter side as long as the image data at the transmitter is adjusted to the desired level(s). Thus, a distance-related value may be transmitted from the receiver or distance detector (such as a camera or sensor with such capability) to the transmitter, and this may be in the form of a measured or computed distance value, a display quality level or value, such as a resolution value or sampling scheme value that indicates which scheme should be used, or an index number or other indicator (0 for 4:4:4, 1 for 4:2:2, 2 for 4:2:0 or other arrangements for example) that indicates the video quality value that is to be used depending on the measured distance value. Also by one approach, the transmission may take place on a user input back channel from a receiver to the transmitter, or other transmission pathway, as described herein.

Process 400 may include "transmit the adjusted pixel data of the at least one frame to a device associated with the display to show the at least one frame on the display" 406. Thus, once the pixel data is adjusted for video quality based on the distance value by adjusting the resolution, sampling and/or other video quality parameter for example, the pixel image data may be encoded and then transmitted to a receiver with a decoder so that the video sequence can be displayed. A device associated with the display refers to a device that can be a receiver that may or may not be considered a part of the display as long as the receiver can provide images for rendering on the display. The transmission, either as embedded into the headers or other areas of the frame, or transmitted separately, may or may not include indication of the resolution or sampling settings used to encode the video sequence. The transmitted frames are then decoded at the resolution set by the encoder, and then converted to RGB when in YUV format. When the decoder provides the decompressed image data at a sub-sampling scheme (not 4:full sampling 4:4:4) used at the encoder, then the sub-sampling scheme is indicated to the YUV to RGB convertor so that the convertor can interpolate the missing color pixel image data before converting to RGB values. It also will be understood that the receiver may simply save or compute the resolution and/or sampling scheme as well when the distance-related value(s) are transmitted to the transmitter and assume the encoder used the settings indicated by the distance related value(s).

Referring to FIG. 5, an example process 500 of adjusting video quality based on viewer distance to a display is provided, and process 500 relates to the operations on a receiver side of a video coding system. In the illustrated implementation, process 500 may include one or more operations, functions or actions as illustrated by one or more of operations 502 to 506 numbered evenly. By way of non-limiting example, process 500 may be described herein with reference to example video coding systems or devices of any of FIGS. 1-3, 9, and 13, and where relevant.

Process 500 may include "receive pixel image data of at least one frame from a remote device" 502, and this refers to receiving compressed image data of a video sequence, either wired or wirelessly, from an encoder for example. The pixel image data may be in the form of compressed data from an encoder. The compressed image data may or may not include an indication of the resolution and sampling scheme used at the encoder, such as in the encoder stream sequence header for one example.

This operation also may include "wherein the pixel image data was adjusted, at least in part, depending on a distance detected between a display and at least one position of a person where the display is visible" 504, and as described with process 400, this may include using a distance detector, whether or not part of a receiver or decoder device. Pixel image data adjusted, depending on the detected distance-related value transmitted to the transmitter or encoder, is received in compressed form by the receiver. As discussed herein, the transmission back to the transmitter (or encoder) may or may not include indication of the settings for resolution and/or sampling adjusted based on the detected distance. This may be computed based on the actual measured or representative distance at the transmitter instead.

Process 500 may include "provide at least one frame of pixel data based on the adjusted pixel image data to render the at least one frame on the display" 506. Thus, the compressed pixel image data may be decoded at a receiver, post-processed, and then rendered on a display. This occurs using pixel image data that had its video quality level determined and possibly adjusted depending on the detected distance, and particularly by one example to adjustments of the resolution and/or sampling scheme made at the transmitter as described herein. It also will be understood that the post-processing of the decoder, and/or the render settings for, or at, the display, may include making the distance-dependent adjustments to the pixel data according to a desired video quality level when the adjustments were not made at the decoder.

Referring to FIG. 6A, an example computer-implemented process 600 of adjusting video quality depending on a viewer distance to a display is provided, and process 600 relates again to the operations on a transmitter side of a video coding system. In the illustrated implementation, process 600 may include one or more operations, functions or actions as illustrated by one or more of operations 602 to 626 numbered evenly. By way of non-limiting example, process 600 may be described herein with reference to example video coding systems or devices of any of FIGS. 1-3, 9, and 13, and where relevant.

Process 600 may include "receive at least one frame of pixel image data" 602. The frames may be received for encoding from the multiple sources as described above. This may be in raw form from a camera for example or otherwise where at least some pre-processing has already been performed on the frames such as de-noising, Bayer-type filter de-mosaicing, color correction and so forth. The frames may be provided in RGB form with an initial resolution.

Process 600 may include "determine distance from display to user(s) viewing display" 604. This may include the preliminary operation to "transmit request for distance-related value" 606, and the transmitter may transmit a request to a receiver or distance detector. This may be performed manually by a user to activate the process such as by hitting a high quality or bandwidth saving button, or may be an automatic initial operation triggered when a pairing connection is made between the transmitter and receiver, or when a play button is activated on a video on the transmitter. Many other alternatives are contemplated.

Referring to FIG. 7, once activated, a distance detection process 700 may be performed. In the illustrated implementation, process 700 may include one or more operations, functions or actions as illustrated by one or more of operations 702 to 716 numbered evenly. By way of non-limiting example, process 700 may be described herein with reference to example video coding systems or devices of any of FIGS. 1-3, 9, and 13, and where relevant.

Process 700 may include "activate sensor unit" 702. The sensor unit or distance detector unit may be activated in a number of different ways as already suggested above whether a request from the transmitter (whether or not activated when a play button is pressed on the transmitter), an automatic activation based on pairing between a receiver and a transmitter, or otherwise whenever the receiver or distance detector is turned on. Other activation events may include whenever the transmitter receives or is about to play a new video sequence or a new scene within a video sequence for continuous monitoring described below. Many other variations are possible such as on mobile devices for example, where recalculation to establish and maintain the connection and streaming may be necessary.

Process 700 may include "obtain sensor data" 704, where triangulation techniques, or IR reflection, or other light beam reflection techniques may be used to obtain depth data. This results in a 3D or depth map of a scene in front of the cameras (or distance detector) including coordinates of any object (a person) or distances to the objects within a scene in front of the sensor unit as indicated by the depth map.

Process 700 may include "detect objects to detect at least one person watching a display" 706. Many different face detection techniques may be used as shown by face recognition homepage (http://www.face-rec.org/algorithms). This may include Karhunen-Loeve's transformation (KLT) based techniques and many others. The result is recognition of a person facing the display when the sensor unit is placed at a fixed position relative to the display and facing in the same direction as the display. Note fixed position here is a global position relative to the display, and the angle of the optical axis of the distance detector still may be moved (rotated, tilted, etc.) as needed.

Process 700 may include "retrieve sensor data to compute distance between display and at least one person" 708. This refers to retrieving the 3D coordinates on the detected face.

Process 700 may include "compute distance to at least one person" 710. By one form, the closest point to the detected face may be used to measure distance. By other forms, it could be some combination such as an average distance to the face or an assumption (or determination) as to the facial features, such that the distance to the eyes may be assumed or calculated exactly depending on the techniques being used.

The distance computation should also consider the distance from the sensor unit to the screen of the display if this is not zero. It may be ignored if it is considered negligible, but otherwise could be added to the distance from the sensor unit to the person to determine a total distance. Otherwise, the conversion from distance to quality level adjustment could take this distance portion in to account so that it does not need to be added to form a total distance each time.

Process 700 may include "determine single distance when multiple people are present" 712. In this situation when multiple people are detected, a single distance to the group may be used, and may be the closest distance to the group. Otherwise, some combination value such as an average distance may be used instead. Many other variations are possible.

Process 700 may include "transmit distance-related value to encoder" 714, and by one optional approach, the distance-related value is transmitted from the receiver, or from the distance detector unit (or sensor unit) if separate from the receiver and to the transmitter. In this example, the conversion from detected distance to video quality adjustment is made on the receiver side. It will be understood, however, that this conversion may be performed on the receiver side so that a distance-related value that is some video quality adjustment value (or a table index number or list index number to determine such video quality adjustment value) may be transmitted to the transmitter instead of transmitting the actual distance value (the actual length) to the transmitter.

As mentioned, the transmission of the distance-related value from the receiver and to the transmitter may be performed on a user input back channel as that described above, but could be any practical network connection whether WiFi or blue tooth based, and so forth.

Process 700 may include "save distance-related value(s) on decoder device" 716. While not being presented in the continuing example here, it should also be noted that other alternatives could be that the distance and/or video quality adjustment values are saved at the receiver in order to make adjustments at the decoder and/or renderer in addition to the adjustments at the transmitter for encoding. Thus, the decoder or receiver may simply assume the values transmitted to the transmitter were used for encoding, and the decoder and/or renderer may use those values to reconstruct the image data so that it should matches the quality level used at the encoder as explained below with process 650 (FIG. 6B) and elsewhere.

Process 700 may include "monitor for new distances" 718, and the process may optionally loop to operation 702, for example, to continuously monitor changes in distance to the viewer viewing the images on the display. This can be implemented in a number of different ways. One way is to simply activate the sensor unit and measure the distance to the person at every uniform interval, such as once a minute or any other time interval for example (which is considered continuous herein since it is automatically repeated based on time regardless of the interval duration). Instead, or in addition, the distance may be measured every time a video sequence starts (or a user hits a play button or image quality button), or every time a new scene (an I-frame) is reached within the video sequence. By one option, the distance may be measured continuously whether or not a video is playing so the system can be ready at the start of playing a video. Many variations exist including measuring the distance whenever a user moves positions in case there is a break in the transmission or streaming.

Continuing with the video quality adjustment process 600, the process 600 may include "receive distance-related value" 608. Thus, the distance-related value, whether the actual distance or length to a person, or to a group, may be received, or the distance-related value may be the video quality adjustment value computed or otherwise determined by using actual distance, including an index number for a table or other listing.

This operation also may include receiving the screen size of the display via Extended Display Identification Data (EDID) for example, which is a known data structure provided by a digital display to describe its capabilities to a video source such as the transmitter. This is the type of program that enables a modern personal computer to know what kinds of monitors are connected to it. The screen size may be the diagonal length of the screen, height by width in pixels, or another representative value.

Process 600 optionally and alternatively may include "detect and compute distance at transmitter" 610, and this is mentioned here to note that the option exists to have the sensor unit (or distance detector unit) mounted on or fixed to the transmitter, such as the camera on a smartphone or tablet for example. Either the transmitter is held by the display and pointed to the person or viewer, or the transmitter is assumed to be with the person watching the display and is held up to measure the distance to the display, whether the transmitter detection unit is able to sense a sensor or object on the display or is able to recognize the display through object recognition (it may look for a planar, screen size area). In this case, the distance and/or resulting video quality adjustment value(s) do not need to be transmitted to the receiver (or decoder) for the transmitter to determine what quality level to set at the encoder. Although, the distance and/or quality level settings (the distance-related value(s)) still may be transmitted, by streaming sequence overhead for example, for the receiver to set the matching quality level for decompressing the image data. The screen size may be provided during setup and pairing but otherwise whenever the distance is received by the transmitter.

Process 600 may include "monitor distance while receiving frames for encoding" 612, and as already mentioned with process 700, the distance may be monitored rather than just measured once at the beginning of a video sequence for example, or once when the system is turned on.

Continuing with the example, assuming the actual distance was transmitted to the transmitter, process 600 may include "determine adjustment(s)" 614. This operation may optionally include "determine frame resolution adjustment" 616.

Figure 8:
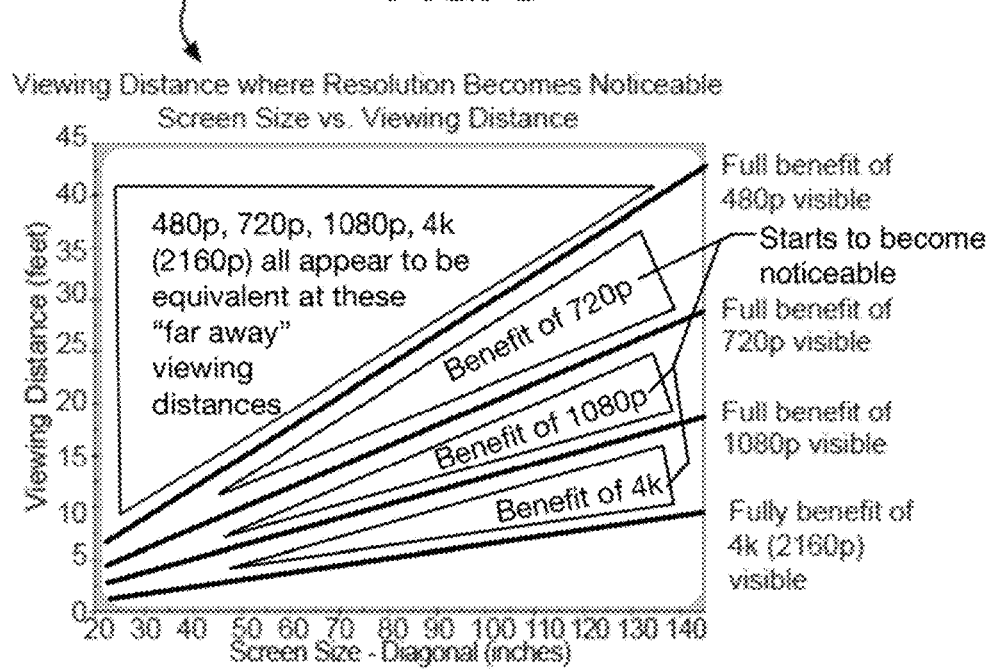
FIG. 8 is a graph showing viewing distance where resolutions become noticeable.

Referring to FIG. 8, a graph 800 shows the relationship among screen size (the horizontal axis), distance to the viewer (vertical axis) and the perceivable resolution. See Carlton Bale, "1080p Does Matter—Here's When (Screen Size vs. Viewing Distance vs. Resolution)", http://carlton-bale.com/1080p-does-matter/. Thus, formulas, tables (such as a look-up table), or lists may be provided that represent the relationships based on the graph 800. With the distance and screen size, the bandwidth and power can be optimized for best perceived video quality.

For example, for a screen size of 50 inches (measured in the diagonal), if the user is within 6 feet of the display, the transmitter may stream a 4 k resolution stream which would be perceived by a viewer at this distance. If the viewer moved to 10 feet away from the same screen, the benefit of 4 k resolution would not be perceivable. The resolution of 1080p would then be sufficient for the best perceptible quality. Hence, in order to save streaming bandwidth and transmit power, the transmitter may reduce the streaming resolution to 1080p from 4 k.

These linear relationships shown on graph 800 may be provided in a formula form where the distance and screen size are inputted and a resolution is outputted, or these values may be placed in a table or listing, and the system looks up the screen size and distance to determine the corresponding resolution.

The resolutions are not particularly limited to just those on the graph 800, and interpolation (or experimentation and testing) can be used for those resolutions not represented by the graph 800. Some known television resolutions (typically listed as picture size) may include Standard-definition television (SDTV) such as 480i (NTSC-compatible digital standard employing two interlaced fields of 243 lines each), 576i (PAL-compatible digital standard employing two interlaced fields of 288 lines each); Enhanced-definition television (EDTV) such as 480p (720×480 progressive scan) and 576p (720×576 progressive scan); High-definition television (HDTV) such as HD (1280×720 progressive scan); Full HDi (1920×1080 split into two interlaced fields of 540 lines);

Full HD (1920×1080 progressive scan); Ultra-high-definition television (UHDTV); 4K UHD (3840×2160 progressive scan); 8K UHD (7680×4320 progressive scan); and 16K UHD (15360×8640 progressive scan) to name a few examples.

Known computer monitor resolutions (with some overlap with televisions) may include:

| Standard | Aspect ratio | Width | Height |
|---|---|---|---|
| SVGA, | 4:3 | 800 | 600 |
| WSVGA | ~17:10 | 1024 | 600 |
| XGA | 4:3 | 1024 | 768 |
| XGA+ | 4:3 | 1152 | 864 |
| WXGA | 16:9 | 1280 | 720 |
| WXGA | 5:3 | 1280 | 768 |
| WXGA | 16:10 | 1280 | 800 |
| SXGA | 5:4 | 1280 | 1024 |
| HD | ~16:9 | 1360 | 768 |
| HD | ~16:9 | 1366 | 768 |
| WXGA+ | 16:10 | 1440 | 900 |
| HD+ | 16:9 | 1600 | 900 |
| UXGA | 4:3 | 1600 | 1200 |
| WSXGA+ | 16:10 | 1680 | 1050 |
| FHD | 16:9 | 1920 | 1080 |
| WUXGA | 16:10 | 1920 | 1200 |
| WQHD | 16:9 | 2560 | 1440 |
| WQXGA | 16:10 | 2560 | 1600 |
| UHD(4K) | 16:9 | 3840 | 2160 |
| UHD(8K) | 16:9 | 7680 | 4320 |
| UHD(16K) | 16:9 | 15360 | 8640 |

In addition or instead of the resolution adjustment, process 600 may include "determine sampling adjustment" 618, to modify the chroma sampling depending on the detected distance as follows.

Figure 9:
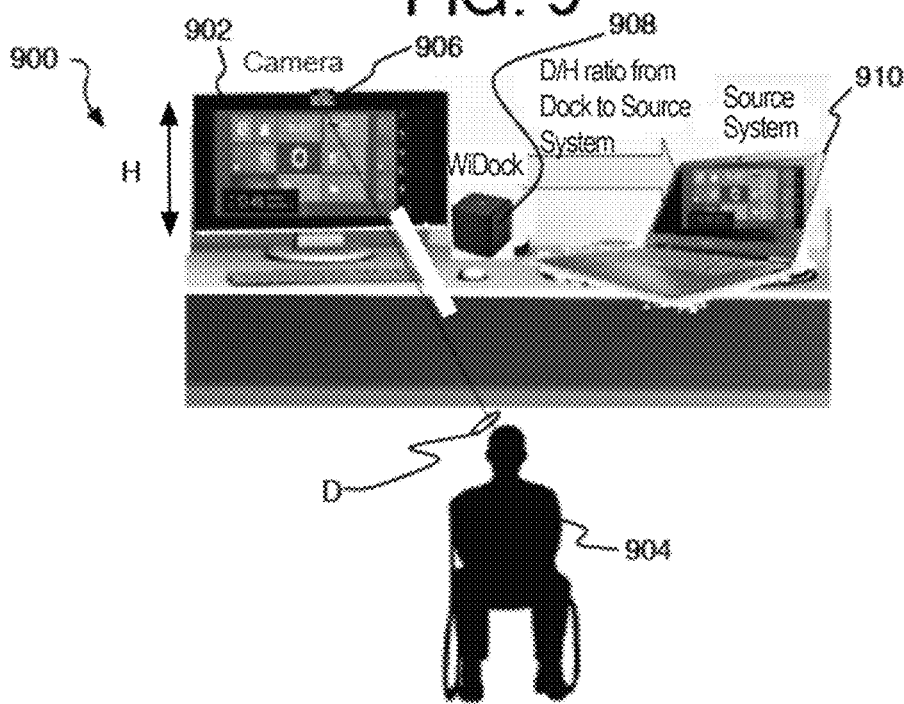
FIG. 9 is a schematic diagram of another network used with the methods of adjusting video quality based on viewer distance to a display in accordance with the implementations herein.

Referring to FIG. 9 (and similarly FIG. 2), an example network 900 has a display 902 in front of a user or viewer 904 at a distance D from the display, and a receiver 908, which here is a WiDock, a camera or distance detector unit 906, which may be paired with the WiDock either by separate connection or through the display connection. A source or transmitter 910 has frames of a video sequence to compress and transmit to the receiver 908 for showing the images on display 902. The height of the display is noted as H.

Figure 10:
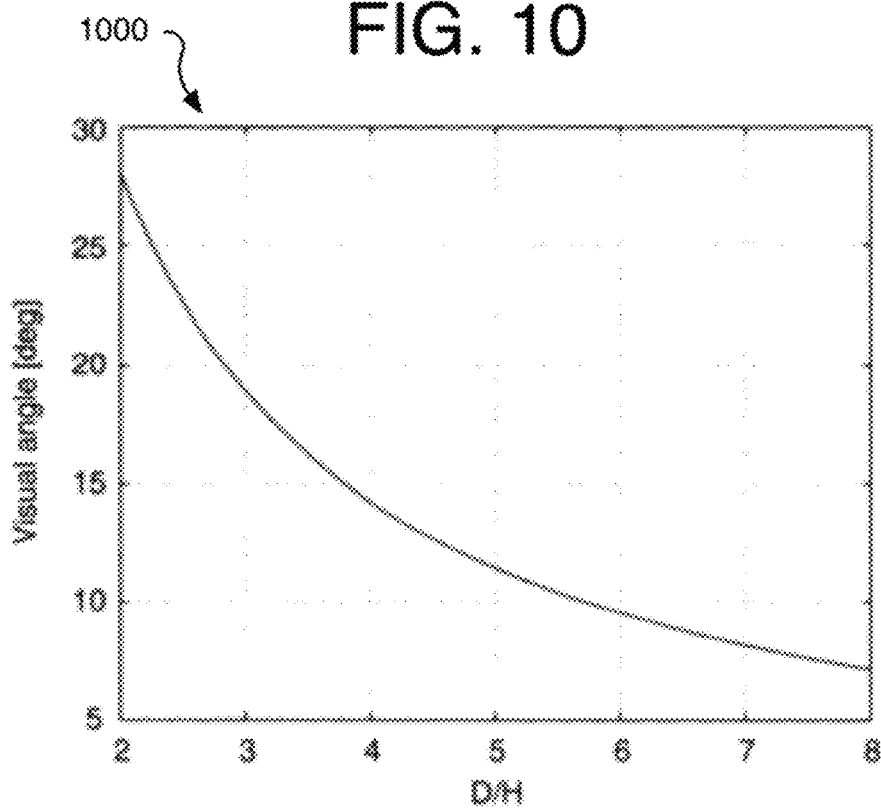
FIG. 10 is a graph showing viewing angle of a display versus a ratio of distance over height to be used with the methods of adjusting video quality based on viewer distance to a display in accordance with the implementations herein.
Figure 11:
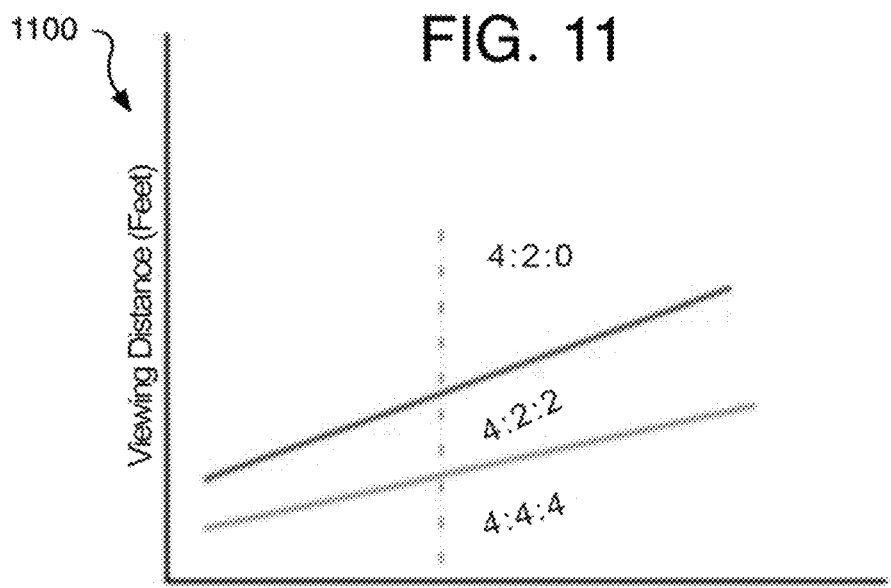
FIG. 11 is a graph showing viewing distance and where chroma sampling benefit becomes noticeable to be used with the methods of adjusting video quality based on viewer distance to a display in accordance with the implementations herein.

For sampling modifications, it is noted that when the ratio of viewing distance (D) to display height (H) increases, the visual angle (v shown on FIG. 2) will exponentially decrease as shown on the graph 1000 (FIG. 10). Graph 1000 shows the relationship between the D/H ratio and the visual angle v. When the viewing angle decreases (and the viewer is farther from the display), the ability of the human eye to perceive the pixel level information decreases. This relationship is shown on graph 1100 (FIG. 11) that shows a relationship between viewing distance, screen size, and chroma sampling scheme. Thus, the transmitter can lower the chroma sampling when the user moves away from the TV or display.

For example, when the viewing distance to height ratio is 1 (just in front of the display) and a fixed screen size is assumed, the 4:4:4 sampling can be used for better video quality. When the user moves a little away, the sub-sampling can be used and the scheme is lowered to 4:2:2. When the user moves far away, the sub-sampling can be lowered again to 4:2:0 as shown on graph 1100. This determination may be made at the distance detector, receiver, or transmitter as with the resolution adjustment. When the receiver makes this determination, the distance related values in form of the chroma subsampling changes (or index value that indicates the change and from a table or listing) can be communicated between source (transmitter) and destination (receiver) when necessary with a control protocol like real time streaming protocol (RTSP). The display height is a constant for a particular TV or display so that the remote TV or display can send the viewing distance and display height to the source system (or transmitter) as well. For WiDock, this can be sent as normal back channel communication on WiGig as mentioned above. In case of wireless display or Miracast™, this can be sent over UIBC or UOIP back channel for transmitting control and data information related to user interaction with the user interface that allows users to connect peripheral devices as mentioned above.

Process 600 may include "adjust the pixel image data of at least one frame depending on the distance" 620. Thus, the computed or determined adjustment is then applied at pre-processing at or before frames are provided to the encoder at or controlled by the transmitter. As mentioned, if this determination takes place at the receiver, then a table or list index number may be transmitted to the transmitter rather than the actual distance of quality level adjustment value, or other value of the resolution and/or sampling. The pre-processing unit, or other component, at the transmitter then applies the adjustments to the frame data thereby scaling the frames to the desired resolution and performing RGB to YUV conversion for example to obtain image data only for those pixel locations in the desired chroma sampling, before providing the frames to the encoder for compression. It will be understood that video quality adjustments other than resolution and chroma sampling could be applied as well.

Process 600 may include "encode pixel image data of frame(s)" 622, such that he frames are then compressed and placed in a bitstream. Whereupon, process 600 may include "transmit encoded image data" 624, and the bitstream is transmitted wirelessly or wired to a receiver for decoding and display.

Also as mentioned, the process 600 may include "transmit adjustment settings to receiver" 626, if the receiver does not already have the adjustment values, and when the receiver may use the adjustment values for fine tuning or other applications.

Referring to FIG. 6B, an example computer-implemented process 650 of adjusting video quality depending on a viewer distance to a display is provided, and process 650 relates to the operations on a receiver side of a video coding system. In the illustrated implementation, process 650 may include one or more operations, functions or actions as illustrated by one or more of operations 602 to 626 numbered evenly. By way of non-limiting example, process 650 may be described herein with reference to example video coding systems or devices of any of FIGS. 1-3, 9, and 13, and where relevant.

Process 650 may include "receive at least one frame of pixel image data at a distance-considered resolution" 652. In other words, the frame size received at the decoder are set at the desired resolution selected at the transmitter and/or the frame image data was encoded while using the chroma sampling desired, either or both set depending on the detected distance. The frame data may be accompanied by indication of the resolution and/or sampling used at the encoder and placed in the encoded stream sequence header for example, or other place mentioned above.

Process 650 may include "decode frame pixel data" 654, and the frame or image data is then decoded, and provided for post-processing. The decoded frames will be in the resolution provided by the encoder (and therefore, already in the desired resolution when the viewer distance is considered), and by one form, the decoder may retrieve the resolution indication in the header of the frame data to setup the frames for the desired resolution or to ensure the desired resolution is used, for example. Likewise, the desired sampling may be retrieved from the header data of the frames, or frame or video sequence, and may be used to reconstruct only those pixel locations that have a location in the chroma sampling.

Process 650 may include "convert YUV pixel data to RGB pixel data" 656, and as mentioned, the YUV is converted to RGB values for each or individual pixels based on the image data from the decoder. Thus, if the decoder did not already provide YUV 4:4:4 sampling as used at the encoder, then the frame data based on YUV sampling schemes such as 4:2:2 or 4:2:0 is provided to the convertor, the convertor obtains the set sampling from the header data, for example, to know what or which interpolation needs to be applied, and the applies interpolation to obtain 4:4:4 data where the missing pixel data is filled in for all pixel locations. The convertor then apples algorithms to convert to RGB pixel image data. Other methods, or alternative methods could be used for the conversion as well, or the conversion may be omitted altogether when the resolution is changed but the sampling is not changed (and encoding may have been performed in RGB color space anyway). Many variations exist.

Process 650 may include "render frame(s)" 658, and any render settings to be adjusted are modified and the frames are rendered or displayed. If not done so already, the rendered may also scale the frame data for a desired resolution such as the desired distance-based resolution.

Figure 12:
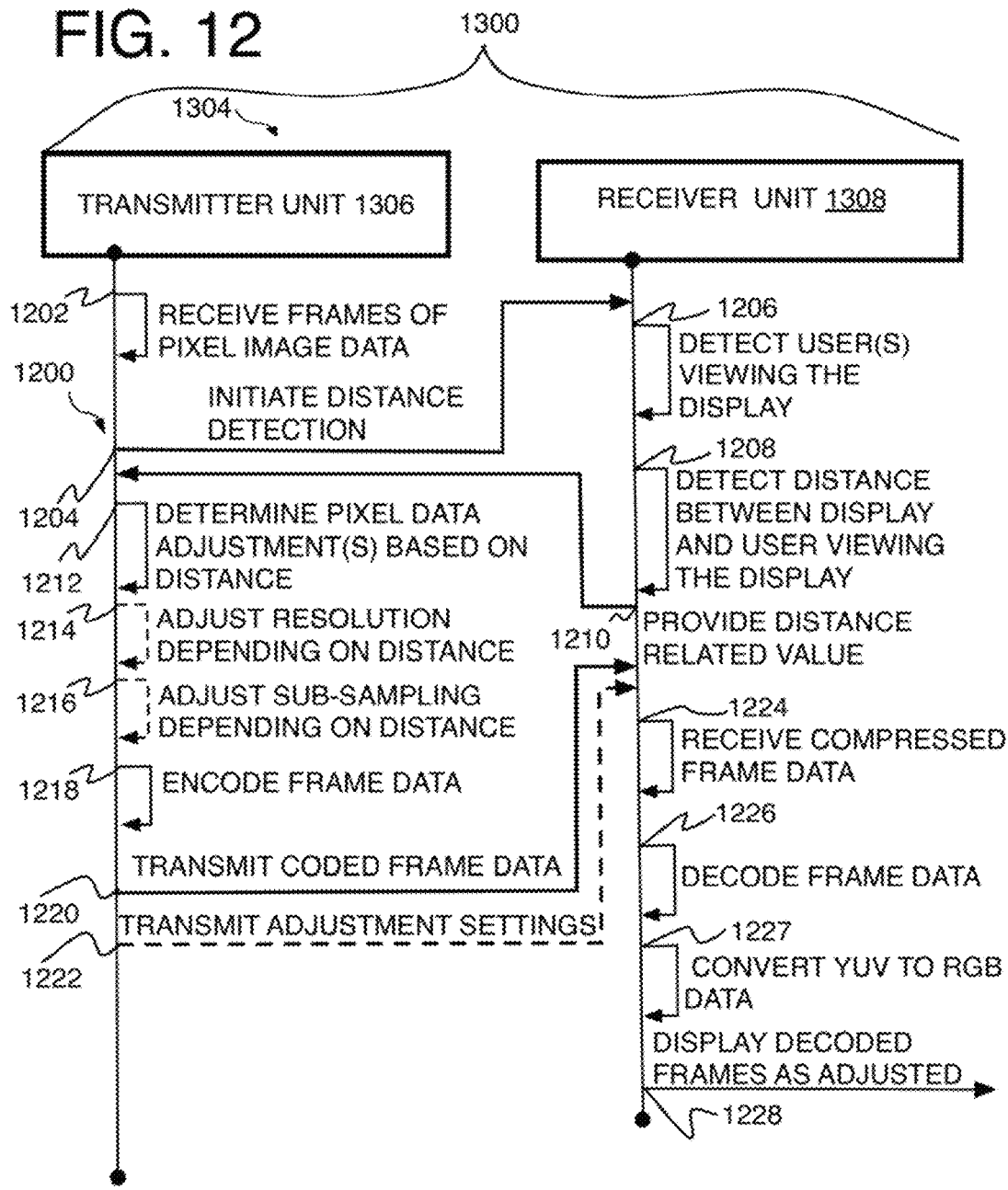
FIG. 12 is an illustrative diagram of video processing system in operation and performing a method of adjusting video quality based on viewer distance to a display in accordance with the implementations herein.

Referring to FIG. 12, by another approach, process 1200 illustrates the operation of a video processing device 1300 that performs a method of adjusting video quality based on viewer distance to a display. In more detail, in the illustrated form, process 1200 may include one or more operations, functions or actions as illustrated by one or more of actions 1202 to 1228 numbered evenly. By way of non-limiting example, process 1200 will be described herein with reference to FIG. 13.

Relevant here, device 1300 includes a distance sensor unit 1303, and logic units 1304 including either a transmitter unit 1306, a receiver unit 1308, or both so that the device can either transmit or receive. Thus, process 1200 may be considered to describe a process using two of the devices 1300, one transmitting and one receiving. One possible form may include using a small network such as a PAN but could be larger networks whether cellular, WiFi, HDMI, satellite, or others. The details are explained above. By one example, one device 1300 may be a smartphone to transmit and another device 1300 may be a television to receive for example. The transmitter unit 1306 may have a pre-processing unit 1310 with a resolution adjusting unit 1312 and a sub-sampling adjusting unit 1314, and an encoder(s) 1316, as described herein. The receiver unit 1308 may have a decoder(s) 1318, a post-processing unit 1320 with a YUV to RGB convertor 1322, and an AV processing/rendering unit 1324. The operation of the device 1300 may proceed as follows.

Process 1200 may include "receive frames of pixel image data" 1202, and particularly, receive frames at the transmitter that are to be encoded, and may be in raw original form but otherwise may be provided with an initial resolution in RGB form. Many variations are possible though.

The process 1200 then may include "initiate distance detection" 1204, and as explained above, the distance detector (or sensor unit) may be activated by request, automatic activation, or otherwise, and a 3D map of the scene in front of the sensor unit may be obtained, or the distances to all objects in front of the sensor unit may be obtained.

The process 1200 then may include "detect user(s) viewing the display" 1206. By the example mentioned above, object or face detection may be used to differentiate people from furniture for example. Once detected, the process 1200 then may include "detect distance between display and user viewing the display" 1208, and as mentioned, this may include computing the distance to the identified person (or people). The process 1200 then may include "provide distance-related value" 1210", and may be the actual distance (as in this example) but could be an adjustment quality level value or index value thereof as described above, and provided to the transmitter from the receiver or separately from the sensor unit when it has such capability.

The process 1200 may include "determine pixel data adjustment(s) based on distance" 1212, also as explained above, the quality level adjustments may be determined depending on the relationship between screen size, distance to the display, and either perceivable resolution or perceivable chroma sampling. The determination can be made by using a formula based on the relationships, such as those provided by graphs 800 or 1100, or may be determined from a table, such as a look-up table, or listing.

The process 1200 may include "adjust resolution depending on distance" 1214, and when resolution is to be adjusted, the image data may be scaled, whether upsampled or downsampled, to the desired resolution before encoding of the frame data. Thus, 4 k or 8 k may be used when high resolution is perceivable, and most likely a viewer is relatively closer to the display, and vice-versa, according to the relationship disclosed by, or similar to, graph 800 for example.

Additionally, or alternatively, the process 1200 may include "adjust sub-sampling depending on distance" 1216. Here, the image data of the frames is adjusted during RGB to YUV conversion during pre-processing for encoding, and by simply omitting the convergence of image data when the pixel location is omitted on the selected YUV chroma sampling scheme. This results in YUV frames with the desired chroma sampling scheme. This may be 4:4:4 when high quality sampling is perceivable but 4:2:0 or 4:2:2 when lower quality sampling is the maximum perceivable sampling, and according to, or similar to, the relationship provided by graph 1100 for example.

The process 1200 then may include "encode frame data" 1218, and as described, the frame data is then encoded at the selected quality level, using more bits for high quality levels that are perceivable by a viewer, and reducing the bits to use lower quality levels when the lower quality is the best quality that can be perceived by a viewer.

The process 1200 may include "transmit coded frame data" 1220. Once the images are encoded, they are placed in a bitstream and transmitted to the receiver over networks already explained above. Optionally, the process 1200 may include "transmit adjustment settings" 1222 as well, when such settings may be needed at the decoder, post-processing, or rendering at the receiver or display, and as mentioned, which may be placed in the encoded streaming sequence header by one example.

The process 1200 may include "receive compressed frame data" 1224, and at the receiver, where the process 1200 then may include "decode frame data" 1226 to obtain the decoded frames, still in YUV form at the desired YUV sampling scheme by one example. The frames are decoded at the desired resolution determined depending on the detected distance as well.

The process 1200 then may include "convert YUV to RGB data" 1227, and particularly to convert YUV pixel image data to RGB pixel image data as described above.

The process 1200 may include "display rendered frames as adjusted" 1228. Thus, the image data of the frames, now converted to RGB frames, may be fine-tuned and then displayed on a display. Thus, a further resolution adjustment could be made at the renderer as well.

It will be appreciated that processes 400, 500, 600, 650, 700, and/or 1200 may be provided by sample video processing systems 100, 200, 300, 900, and/or 1300 to operate at least some implementations of the present disclosure. In addition, any one or more of the operations of FIGS. 4, 5, 6A, 6B, 7, and 12 may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 13:
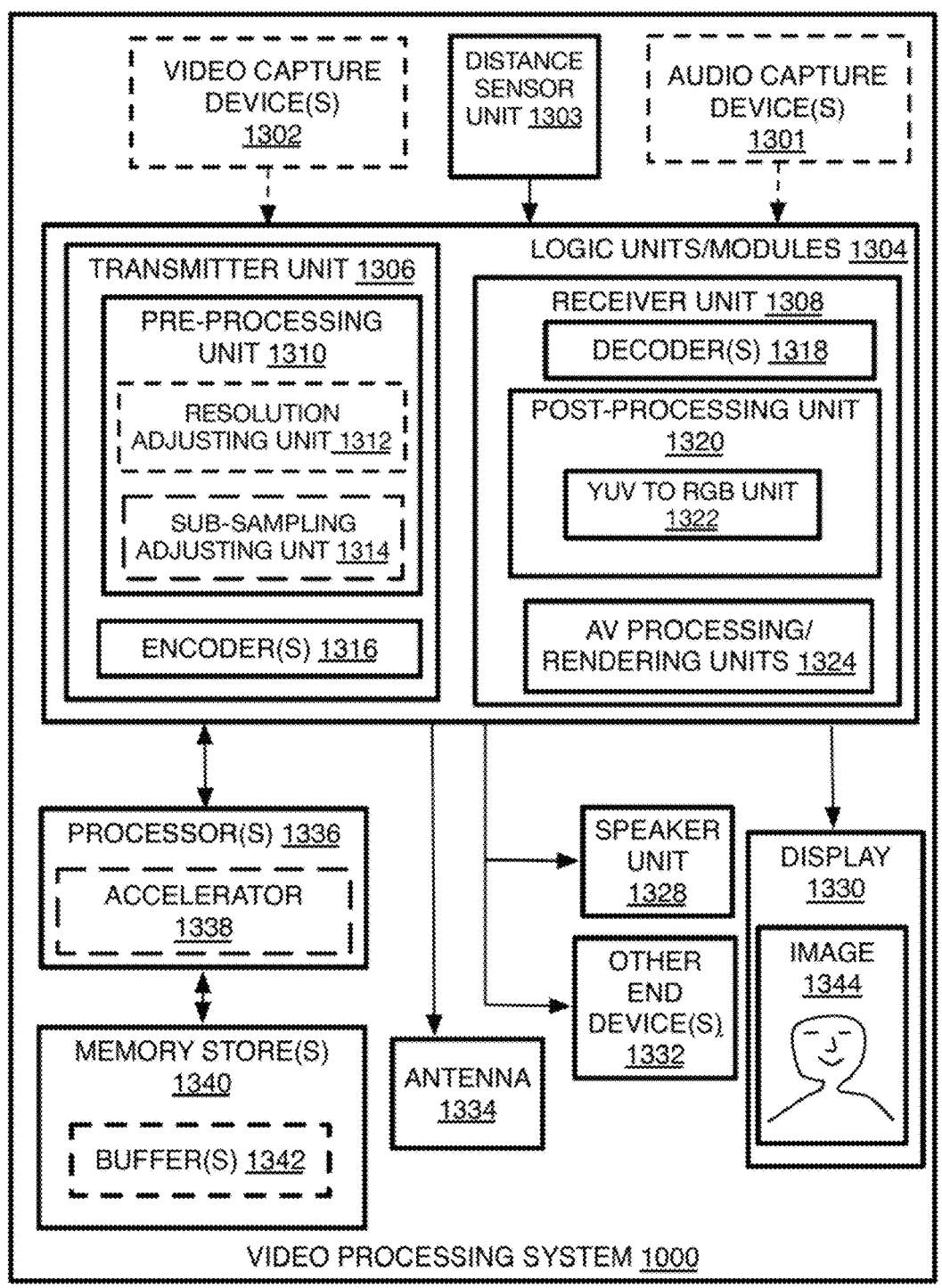
FIG. 13 is an illustrative diagram of an example system.

Referring to FIG. 13, an example video (or AV) processing system or device 1300 is arranged in accordance with at least some implementations of the present disclosure. The system 1300 may be have a receiver, a transmitter, or both described in detail herein. The device 1300 also may be referred to as an encoder, a decoder, or an image processing device such as an image display device (television, computer, smartphone, tablet, and so forth). Thus, multiple devices 1300 could be used, and on both ends of a network, one transmitting and one receiving. As mentioned with process 1200, one possible form may include using a PAN system where one device 1300 may be a smartphone to transmit and another device 1300 may be a television to receive for example In various implementations, the example video processing system or receiver 1300 may have a video capture device(s) 1302 and optionally an audio capture device(s) 1313 so that the receiver can act as a transmitter to form or receive AV data if desired. This can be implemented in various ways. Thus, in one form, the video processing system 1300 is a device, or is on a device, with a number of cameras, and may also have microphones. In other examples, the video processing system 1300 may be in communication with one or a network of cameras (or microphones), and may be remote from these devices such that logic modules 1304 may communicate remotely with, or otherwise may be communicatively coupled to, the cameras (and microphones) for further processing of the captured video data (with or without audio data).

The system 1300 may have one or more video capture or imaging devices 1302 such as cameras for capturing images either alone or along with capturing audio. Such technology may include a camera such as a digital camera system, a dedicated camera device, or an imaging phone or tablet, camera that provides a preview screen, or some combination of these. Thus, in one form, imaging device 1302 may include camera hardware and optics including one or more sensors as well as auto-focus, zoom, aperture, ND-filter, auto-exposure, flash, and actuator controls. These controls may be part of a sensor module or component for operating the sensor that can be used to generate images for a viewfinder and take still pictures or video. The imaging device 1302 also may have a lens, an image sensor with a RGB Bayer color filter, an analog amplifier, an A/D converter, other components to convert incident light into a digital signal, the like, and/or combinations thereof. The digital signal also may be referred to as the raw image data herein.

Other forms include a camera sensor-type imaging device or the like (for example, a webcam or webcam sensor or other complementary metal-oxide-semiconductor-type image sensor (CMOS)) in addition to, or instead of, the use of a red-green-blue (RGB) depth camera and/or microphone-array to locate who is speaking. The camera sensor may also support other types of electronic shutters, such as global shutter in addition to, or instead of, rolling shutter, and many other shutter types. In other examples, an RGB-Depth camera and/or microphone-array might be used in the alternative to a camera sensor. In some examples, imaging device 1302 may be provided with an eye tracking camera. The type of camera and image format is not particularly limited as long as it can measure the distance to a user that is viewing the display that shows the images of frames being decoded by one of the present devices 1300.

The device 1300 also may have a distance sensor unit 1303 to detect the location of objects in a scene and to determine the distance from a remote display to the object, here a person watching the display. The distance sensor unit may be, or may part of, any of the configurations for the video capture device 1302, or may be a separate device as shown. Thus, the distance sensor unit may be, or may be part of, an RGB-D camera with multiple sensors, or an IR sensor system with a projector and at least one other sensor. The distance sensor unit 1303 may be part of a receiver or a transmitter in a PAN established to perform the methods herein, or may be a separate unit. Thus, the distance sensor unit 1303 may be integrated within the receiver or transmitter, or may be fixed or otherwise mounted to an exterior of such devices, or may be a completely separate device that communicates wirelessly or is wired to the receiver, transmitter, or both. Many options are possible as long as the distance sensor unit 1303 can provide at least one distance-related value to a transmitter device as described in detail above.

In the illustrated example, the device 1300 may have logic units or modules 1304 that has a receiver unit 1306, a transmitter unit 1308 or both. The transmitter unit 1306 may have a pre-processing unit 1310 with a resolution adjusting unit 1312 and a sub-sampling adjusting unit 1314, and an encoder(s) 1316, as described herein. The receiver unit 1308 may have a decoder(s) 1318, a post-processing unit 1320 with a YUV to RGB convertor 1322, and an AV processing/rendering unit 1324. The operations of these components are detailed above.

The system 1300 may have one or more processors 1336 which may include a dedicated accelerator 1338 such as the Intel Atom, memory stores 1340 which may or may not hold buffers 1342 including buffers for images in various stages along the video coding process on either the transmitter or receiver side or both. This may include buffers to hold RGB or YUV images in various stages and in various resolutions. Otherwise, the video processing system or device 1300 may include at least one speaker unit 1328 to emit audio when desired, one or more displays 1330 to provide images 1344 when desired, any other end device(s) 1332, and antenna 1334 to transmit or receive data as mentioned above. In one example implementation, the image processing system 1300 may have the at least one processor 1336 communicatively coupled to the transmitter unit 1306 and/or receiver unit 1308, and at least one memory 1324. The antenna 1334 also may be provided to transmit other commands to a paired device or other devices. As illustrated, any of these components may be capable of communication with one another and/or communication with portions of logic modules 1304. Thus, processors 1336 may be communicatively coupled to the antenna 1334, the logic modules 1304, and the memory 1324 for operating those components.

Although the device 1300, as shown in FIG. 13, may include one particular set of blocks or actions associated with particular components or modules, these blocks or actions may be associated with different components or modules than the particular component or module illustrated here.

Figure 14:
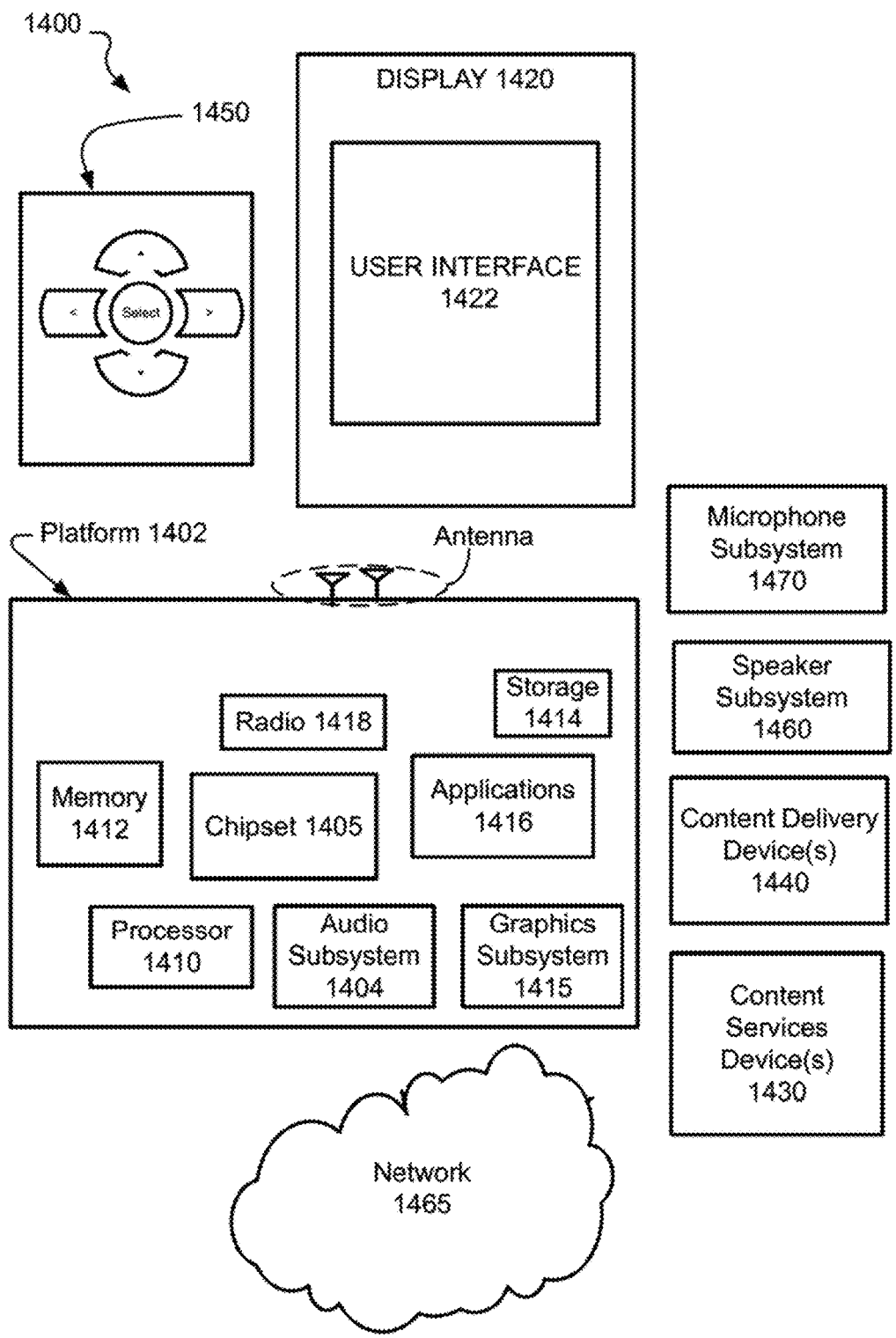
FIG. 14 is an illustrative diagram of another example system.

Referring to FIG. 14, an example system 1400 in accordance with the present disclosure operates one or more aspects of the audio processing system described herein and may be either a transmitter (source) or receiver (sink) (or both) as described herein. It will be understood from the nature of the system components described below that such components may be associated with, or used to operate, certain part or parts of the audio processing system described above. In various implementations, system 1400 may be a media system although system 1400 is not limited to this context. For example, system 1400 may be incorporated into one or more microphones of a network of microphones, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth, but otherwise any device having an acoustic signal analyzing device, and often a display device as well.

In various implementations, system 1400 includes a platform 1402 coupled to a display 1420. Platform 1402 may receive content from a content device such as content services device(s) 1430 or content delivery device(s) 1440 or other similar content sources. A navigation controller 1450 including one or more navigation features may be used to interact with, for example, platform 1402, speaker subsystem 1460, microphone subsystem 1470, and/or display 1420. Each of these components is described in greater detail below.

In various implementations, platform 1402 may include any combination of a chipset 1405, processor 1410, memory 1412, storage 1414, audio subsystem 1404, graphics subsystem 1415, applications 1416 and/or radio 1418. Chipset 1405 may provide intercommunication among processor 1410, memory 1412, storage 1414, audio subsystem 1404, graphics subsystem 1415, applications 1416 and/or radio 1418. For example, chipset 1405 may include a storage adapter (not depicted) capable of providing intercommunication with storage 1414.

Processor 1410 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1410 may be dual-core processor(s), dual-core mobile processor(s), and so forth.

Memory 1412 may be implemented as a volatile memory device such as, but not limited to, a Random Access Memory (RAM), Dynamic Random Access Memory (DRAM), or Static RAM (SRAM).

Storage 1414 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1414 may include technology to increase the storage performance enhanced protection for valuable digital media when multiple hard drives are included, for example.

Audio subsystem 1404 may perform processing of audio. The audio subsystem 1404 may comprise one or more processing units, memories, and accelerators. Such an audio subsystem may be integrated into processor 1410 or chipset 1405. In some implementations, the audio subsystem 1404 may be a stand-alone card communicatively coupled to chipset 1405. An interface may be used to communicatively couple the audio subsystem 1404 to a speaker subsystem 1460, microphone subsystem 1470, and/or display 1420.

Graphics subsystem 1415 may perform processing of images such as still or video for display. Graphics subsystem 1415 may be a graphics processing unit (GPU) or a visual processing unit (VPU), for example. An analog or digital interface may be used to communicatively couple graphics subsystem 1415 and display 1420. For example, the interface may be any of a High-Definition Multimedia Interface, Display Port, wireless HDMI, and/or wireless HD compliant techniques. Graphics subsystem 1415 may be integrated into processor 1410 or chipset 1405. In some implementations, graphics subsystem 1415 may be a stand-alone card communicatively coupled to chipset 1405.

The audio processing techniques described herein may be implemented in various hardware architectures. For example, audio functionality may be integrated within a chipset. Alternatively, a discrete audio processor may be used. As still another implementation, the audio functions may be provided by a general purpose processor, including a multi-core processor. In further implementations, the functions may be implemented in a consumer electronics device.

Radio 1418 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), wireless display (WiDis) to establish PAN or mirroring networks, cellular networks, and satellite networks. In communicating across such networks, radio 1418 may operate in accordance with one or more applicable standards in any version.

In various implementations, display 1420 may include any television type monitor or display. Display 1420 may include, for example, a computer display screen, touch screen display, video monitor, television-like device, and/or a television. Display 1420 may be digital and/or analog. In various implementations, display 1420 may be a holographic display. Also, display 1420 may be a transparent surface that may receive a visual projection. Such projections may convey various forms of information, images, and/or objects. For example, such projections may be a visual overlay for a mobile augmented reality (MAR) application. Under the control of one or more software applications 1416, platform 1402 may display user interface 1422 on display 1420.

In various implementations, content services device(s) 1430 may be hosted by any national, international and/or independent service and thus accessible to platform 1402 via the Internet, for example. Content services device(s) 1430 may be coupled to platform 1402 and/or to display 1420, speaker subsystem 1460, and microphone subsystem 1470. Platform 1402 and/or content services device(s) 1430 may be coupled to a network 1465 to communicate (e.g., send and/or receive) media information to and from network 1465. Content delivery device(s) 1440 also may be coupled to platform 1402, speaker subsystem 1460, microphone subsystem 1470, and/or to display 1420.

In various implementations, content services device(s) 1430 may include a network of microphones, a cable television box, personal computer, network, telephone, Internet enabled devices or appliance capable of delivering digital information and/or content, and any other similar device capable of unidirectionally or bidirectionally communicating content between content providers and platform 1402 and speaker subsystem 1460, microphone subsystem 1470, and/or display 1420, via network 1465 or directly. It will be appreciated that the content may be communicated unidirectionally and/or bidirectionally to and from any one of the components in system 1400 and a content provider via network 1460. Examples of content may include any media information including, for example, video, music, medical and gaming information, and so forth.

Content services device(s) 1430 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1402 may receive control signals from navigation controller 1450 having one or more navigation features. The navigation features of controller 1450 may be used to interact with user interface 1422, for example. In implementations, navigation controller 1450 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures. The audio subsystem 1404 also may be used to control the motion of articles or selection of commands on the interface 1422.

Movements of the navigation features of controller 1450 may be replicated on a display (e.g., display 1420) by movements of a pointer, cursor, focus ring, or other visual indicators displayed on the display or by audio commands. For example, under the control of software applications 1416, the navigation features located on navigation controller 1450 may be mapped to virtual navigation features displayed on user interface 1422, for example. In implementations, controller 1450 may not be a separate component but may be integrated into platform 1402, speaker subsystem 1460, microphone subsystem 1470, and/or display 1420. The present disclosure, however, is not limited to the elements or in the context shown or described herein.

In various implementations, drivers (not shown) may include technology to enable users to instantly turn on and off platform 1402 like a television with the touch of a button after initial boot-up, when enabled, for example, or by auditory command. Program logic may allow platform 1402 to stream content to media adaptors or other content services device(s) 1430 or content delivery device(s) 1440 even when the platform is turned "off" In addition, chipset 1405 may include hardware and/or software support for 8.1 surround sound audio and/or high definition (7.1) surround sound audio, for example. Drivers may include an auditory or graphics driver for integrated auditory or graphics platforms. In implementations, the auditory or graphics driver may comprise a peripheral component interconnect (PCI) Express graphics card.

In various implementations, any one or more of the components shown in system 1400 may be integrated. For example, platform 1402 and content services device(s) 1430 may be integrated, or platform 1402 and content delivery device(s) 1440 may be integrated, or platform 1402, content services device(s) 1430, and content delivery device(s) 1440 may be integrated, for example. In various implementations, platform 1402, speaker subsystem 1460, microphone subsystem 1470, and/or display 1420 may be an integrated unit. Display 1420, speaker subsystem 1460, and/or microphone subsystem 1470 and content service device(s) 1430 may be integrated, or display 1420, speaker subsystem 1460, and/or microphone subsystem 1470 and content delivery device(s) 1440 may be integrated, for example. These examples are not meant to limit the present disclosure.

In various implementations, system 1400 may be implemented as a wireless system, a wired system, or a combination of both. When implemented as a wireless system, system 1400 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1400 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1402 may establish one or more logical or physical channels to communicate information. The information may include media information and control information. Media information may refer to any data representing content meant for a user. Examples of content may include, for example, data from a voice conversation, videoconference, streaming video and audio, electronic mail ("email") message, voice mail message, alphanumeric symbols, graphics, image, video, audio, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 14.

Figure 15:
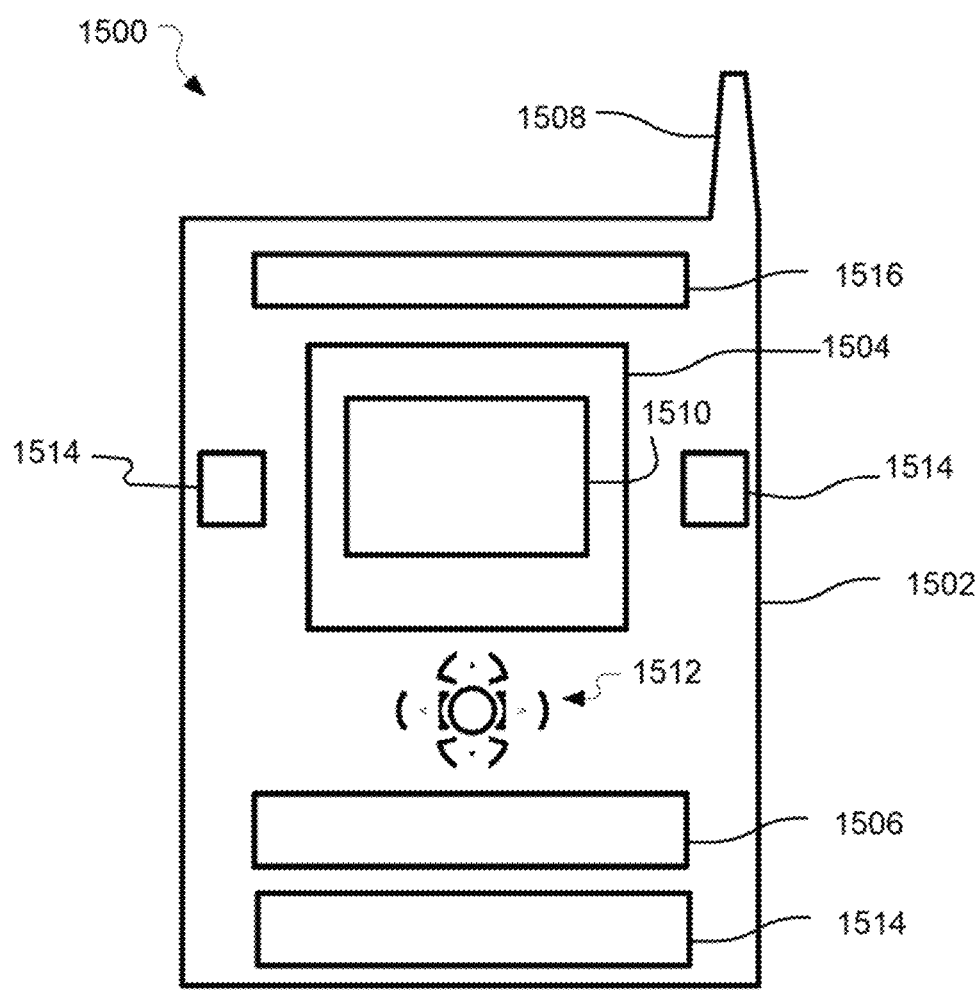
FIG. 15 illustrates another example device, all arranged in accordance with at least some implementations of the present disclosure.

Referring to FIG. 15, a small form factor device 1500 is one example of the varying physical styles or form factors in which system 100, 200, 300, 900, or 1300 may be embodied. By this approach, device 1500 may be implemented as a mobile computing device having wireless capabilities and may be one device used in an example PAN described above. A mobile computing device may refer to any device having a processing system and a mobile power source or supply, such as one or more batteries, for example.

As described above, examples of a mobile computing device may include any device with an audio sub-system such as a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, speaker system, and/or microphone system or network.

Examples of a mobile computing device also may include computers that are arranged to be worn by a person, such as a head-phone, head band, hearing aide, wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 15, device 1500 may include a housing 1502, a display 1504 including a screen 1510, an input/output (I/O) device 1506, and an antenna 1508. Device 1500 also may include navigation features 1512. Display 1504 may include any suitable display unit for displaying information appropriate for a mobile computing device. I/O device 1506 may include any suitable I/O device for entering information into a mobile computing device. Examples for I/O device 1506 may include an alphanumeric keyboard, a numeric keypad, a touch pad, input keys, buttons, switches, rocker switches, software and so forth. Information also may be entered into device 1500 by way of one or more microphones 1514. Such information may be processed by an audio transmitter or source as described herein and as part of the device 1500, and may provide audio via a speaker 1516 or visual responses via screen 1510. The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By one implementation, a computer-implemented method of video coding comprises receiving pixel image data of at least one frame of a video sequence; adjusting the pixel image data of the at least one frame depending on a detected distance between a display and at least one position of a person where the display is visible; and transmitting the adjusted pixel image data of the at least one frame to a device associated with the display to show the at least one frame on the display.

The method also may comprise wherein adjusting the pixel image data comprises adjusting a quality level of the pixel image data of the at least one frame so that the quality level of the pixel image data will be perceived by a viewer at the detected distance; wherein the quality level is adjusted by at least one of: increasing the resolution of the at least one frame as the detected distance becomes smaller, and increasing the chroma pixels sampled in a sampling scheme and for the at least one frame as the detected distance becomes smaller. The method comprising receiving at least one distance-related value to be used to adjust a quality level of pixel image data of the at least one frame, and comprising at least one of (1) receiving a transmitted distance value as the distance-related value; and determining a quality level adjustment value that corresponds to the distance-related value, and (2) receiving a transmitted quality level adjustment value that corresponds to a distance value that is the detected distance; wherein the detected distance is obtained from a distance detection unit that is at a fixed position relative to the display. The method also may comprise receiving an indication that the detected distance is changing over time to modify the adjusting of the pixel image data to generally match the changes in the detected distance.

By another implementation, a computer-implemented method of video coding comprises receiving pixel image data of at least one frame from a remote device, wherein the pixel image data was adjusted, at least in part, depending on a distance detected between a display and at least one position of a person where the display is visible; and providing at least one frame of pixel data based on the adjusted pixel image data to render the at least one frame on the display.

This method also may comprise wherein the pixel image data of at least one frame was adjusted to a quality level so that the quality level of the pixel image data will be perceived by a viewer at the detected distance; wherein the quality level is adjusted by at least one of: increasing the resolution of the at least one frame as the detected distance becomes smaller, and increasing the chroma pixels sampled in a sampling scheme and for the at least one frame as the detected distance becomes smaller.

By another example, a computer-implemented system comprises at least one display; at least one memory to store pixel image data of at least one frame of a video sequence; at least one processor communicatively coupled to the at least one of the memory and display; and a transmitter with a pre-processing unit and an encoder operated by the at least one processor and to operated by: receiving pixel image data of at least one frame of a video sequence; adjusting the pixel image data of the at least one frame depending on a detected distance between a display and at least one position of a person where the display is visible; and transmitting the adjusted pixel data of the at least one frame to a device associated with the display to show the at least one frame on the display.

The computer-implemented system also may comprise wherein adjusting the pixel image data comprises adjusting a quality level of the pixel image data of the at least one frame so that the quality level of the pixel image data will be perceived by a viewer at the detected distance; wherein at least one of (1) the quality level is adjusted by increasing the resolution of the at least one frame as the detected distance becomes smaller, and (2) the quality level is adjusted by increasing the chroma pixels sampled in a sampling scheme and for the at least one frame as the detected distance becomes smaller; wherein the transmitter is further operated by receiving indication that the detected distance is changing over time by at least one of: set uniform intervals and when a video sequence ends or starts in order to modify the adjustment to the pixel image data to correspond to the change in detected distance; wherein at least one of the detected distance is a combination of distances each to a different person, and the detected distance is the closest distance to a group of people; the transmitter is to operate by receiving at least one of: (A) a distance-related value that is a quality level adjustment value or a table index value that corresponds to a quality level adjustment value, wherein the quality level adjustment value is a resolution value or a sampling scheme value, and (B) a distance-related value that is the detected distance; determining a pixel image data adjustment value associated with a quality level depending on the detected distance by at least one of: computing the pixel image data adjustment value using a formula and looking up the pixel image data adjustment value on a stored list or table; receiving a distance-related value that is a position in front of the display; computing the detected distance to the display based on the position; and determining a pixel image data adjustment to a quality level depending on the detected distance; wherein the distance-related value is received in a transmission over a user input back channel of a personal area network (PAN).

In a further example, a computer-readable medium has stored thereon instructions that when executed cause a computing device to operate by: receiving pixel image data of at least one frame of a video sequence; adjusting the pixel image data of the at least one frame depending on a detected distance between a display and at least one position of a person where the display is visible; and transmitting the adjusted pixel data of the at least one frame to a device associated with the display to show the at least one frame on the display.

The instructions that when executed cause a computing device to operate by having the pixel image data of at least one frame adjusted to a quality level so that the quality level of the pixel image data will be perceived by a viewer at the detected distance; wherein the quality level is adjusted by at least one of: increasing the resolution of the at least one frame as the detected distance becomes smaller, and increasing the chroma pixels sampled in a sampling scheme and for the at least one frame as the detected distance becomes smaller. The instructions causing the computing device to operate by receiving at least one distance-related value to be used to adjust a quality level of pixel image data of the at least one frame, and comprising at least one of (1) receiving a transmitted distance value as the distance-related value; and determining a quality level adjustment value that corresponds to the distance-related value, and (2) receiving a transmitted quality level adjustment value that corresponds to a distance value that is the detected distance; wherein the detected distance is obtained from a distance detection unit that is at a fixed position relative to the display. This also may include receiving an indication that the detected distance is changing over time to modify the adjusting of the pixel image data to generally match the changes in the detected distance.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of video coding comprising:
   receiving pixel image data of at least one frame of a video sequence;
   remotely, relative to a display device, and during pre-processing before encoding of the pixel image data, adjusting, by at least one processor, the pixel image data of the at least one frame depending on a detected distance between a display and at least one position of a person where the display is visible comprising:
      obtaining a distance-related value associated with the distance and obtained remotely from the display,
      using the value to set a resolution or YUV sampling scheme or both to be used to adjust the pixel image data, and
      adjusting the pixel image data according to the set resolution or YUV sampling scheme or both;
   encoding, by at least one processor, the adjusted pixel image data; and
   transmitting the adjusted and compressed pixel image data of the at least one frame to the display device associated with the display to show the at least one frame on the display.

2. The method of claim 1 wherein adjusting the pixel image data comprises adjusting a quality level of the pixel image data of the at least one frame so that the quality level of the pixel image data will be perceived by a viewer at the detected distance.

3. The method of claim 2 wherein the quality level is adjusted by increasing the resolution of the at least one frame as the detected distance becomes smaller and comprising upsampling or downsampling the pixel image data as YUV data converted from raw RGB data, and wherein the pixel image data in the YUV form to be used to encode the pixel image data.

4. The method of claim 2 wherein the quality level is adjusted by increasing the chroma pixels sampled in a Y:U:V sampling scheme and for the at least one frame as the detected distance becomes smaller and comprising changing the Y:U:V sampling scheme to convert the pixel image data from RGB data to YUV data and to encode the pixel image data as YUV data.

5. The method of claim 1 wherein using the value to set a resolution or YUV sampling scheme comprises changing a Y:U:V sampling scheme among 4:4:4, 4:2:2, and 4:2:0 Y:U:V sampling.

6. The method of claim 1 comprising receiving a transmitted distance as the distance-related value; and determining a quality level adjustment value that corresponds to the distance-related value.

7. The method of claim 1 comprising receiving a transmitted quality level adjustment value that corresponds to a distance value that is the detected distance.

8. The method of claim 1 wherein the detected distance is obtained from a distance detection unit that is at a fixed position relative to the display.

9. The method of claim 1 comprising receiving an indication that the detected distance is changing over time to modify the adjusting of the pixel image data to generally match the changes in the detected distance.

10. A computer-implemented method of video coding comprising:
    receiving compressed pixel image data of at least one frame from a remote device, wherein the pixel image data was adjusted by at least one processor at the remote device, at least in part, depending on a distance detected between a display and at least one position of a person where the display is visible, the adjusting comprising:
       obtaining a distance-related value associated with the distance and obtained remotely from the display,
       using the value to set a resolution or YUV sampling scheme or both to be used to adjust the pixel image data, and
       adjusting the pixel image data according to the set resolution or YUV sampling scheme or both;
    decoding, by at least one processor, the adjusted pixel image data; and
    providing at least one frame of pixel data based on the adjusted pixel image data to render the at least one frame on the display.

11. The method of claim 10 wherein the pixel image data of at least one frame was adjusted to a quality level so that the quality level of the pixel image data will be perceived by a viewer at the detected distance; wherein the quality level is adjusted by at least one of:
    increasing the resolution of the at least one frame as the detected distance becomes smaller, and
    increasing the chroma pixels sampled in a sampling scheme and for the at least one frame as the detected distance becomes smaller.

12. A computer-implemented system comprising:
    at least one display;
    at least one memory to store pixel image data of at least one frame of a video sequence;
    at least one processor communicatively coupled to the at least one of the memory and display; and a transmitter with a pre-processing unit and an encoder operated by the at least one processor and to operated by:
receiving pixel image data of at least one frame of a video sequence;
remotely, relative to a display device, and during pre-processing before encoding of the pixel image data, adjusting the pixel image data of the at least one frame depending on a detected distance between a display and at least one position of a person where the display is visible, comprising:
obtaining a distance-related value associated with the distance and obtained remotely from the display,
using the value to set a resolution or YUV sampling scheme or both to be used to adjust the pixel image data, and
adjusting the pixel image data according to the set resolution or YUV sampling scheme or both;
encoding the adjusted pixel image data; and
transmitting the adjusted and compressed pixel image data of the at least one frame to the display device associated with the display to show the at least one frame on the display.

13. The system of claim 12 wherein adjusting the pixel image data comprises adjusting a quality level of the pixel image data of the at least one frame so that the quality level of the pixel image data will be perceived by a viewer at the detected distance.

14. The system of claim 13 wherein the quality level is adjusted by increasing the resolution of the at least one frame as the detected distance becomes smaller and comprising upsampling or downsampling the pixel image data as YUV data converted from raw RGB data, and wherein the pixel image data in the YUV form to be used to encode the pixel image data.

15. The system of claim 13 wherein the quality level is adjusted by increasing the chroma pixels sampled in a sampling scheme and for the at least one frame as the detected distance becomes smaller and comprising changing the sampling scheme to convert the pixel image data from RGB data to YUV data and to encode the pixel image data as YUV data.

16. The system of claim 12 wherein the transmitter is further operated by receiving indication that the detected distance is changing over time by at least one of: set uniform intervals and when a video sequence ends or starts in order to modify the adjustment to the pixel image data to correspond to the change in detected distance.

17. The system of claim 12 wherein the detected distance is a combination of distances each to a different person.

18. The system of claim 12 wherein the detected distance is the closest distance to a group of people.

19. The system of claim 12 comprising receiving a distance-related value that is a quality level adjustment value or a table index value that corresponds to a quality level adjustment value.

20. The system of claim 19 wherein the quality level adjustment value is a resolution value or a sampling scheme value.

21. The system of claim 12 comprising:
receiving a distance-related value that is the detected distance;
determining a pixel image data adjustment value associated with a quality level depending on the detected distance by at least one of: computing the pixel image data adjustment value using a formula and looking up the pixel image data adjustment value on a stored list or table.

22. The system of claim 12 comprising:
receiving a distance-related value that is a position in front of the display;
computing the detected distance to the display based on the position; and
determining a pixel image data adjustment to a quality level depending on the detected distance.

23. The system of claim 12 wherein the distance-related value is received in a transmission over a user input back channel of a personal area network (PAN).

24. A non-transitory computer-readable medium having stored thereon instructions that when executed cause a computing device to operate by:
receiving pixel image data of at least one frame of a video sequence;
remotely, relative to a display device, and during pre-processing before encoding of the pixel image data, adjusting, by at least one processor, the pixel image data of the at least one frame depending on a detected distance between a display and at least one position of a person where the display is visible, comprising:
obtaining a distance-related value associated with the distance and obtained remotely from the display,
using the value to set a resolution or YUV sampling scheme or both to be used to adjust the pixel image data, and
adjusting the pixel image data according to the set resolution or YUV sampling scheme or both;
encoding, by at least one processor, the adjusted pixel image data; and
transmitting the adjusted and compressed pixel image data of the at least one frame to the display device associated with the display to show the at least one frame on the display.

25. The medium of claim 24 wherein the pixel image data of at least one frame was adjusted to a quality level so that the quality level of the pixel image data will be perceived by a viewer at the detected distance; wherein the quality level is adjusted by at least one of:
increasing the resolution of the at least one frame as the detected distance becomes smaller, and
increasing the chroma pixels sampled in a sampling scheme and for the at least one frame as the detected distance becomes smaller.

* * * * *